(12) United States Patent
Akopyan

(10) Patent No.: US 6,241,929 B1
(45) Date of Patent: Jun. 5, 2001

(54) METHOD AND APPARATUS FOR MOLDING THREE-DIMENSIONAL OBJECTS OF COMPLEX SHAPE BY MEANS OF RF HEATING

(76) Inventor: Razmik L. Akopyan, 1945 Jamestown Dr., Olathe, KS (US) 66062

( * ) Notice: Subject to any disclaimer, the term of this patent is extended or adjusted under 35 U.S.C. 154(b) by 0 days.

(21) Appl. No.: 09/363,601

(22) Filed: Jul. 29, 1999

(51) Int. Cl.$^7$ ................................................. B29C 33/40
(52) U.S. Cl. .................... 264/219; 249/134; 264/402; 264/405; 264/491; 425/174.4
(58) Field of Search .................. 425/174.4, 174.8, 425/174.8 E, DIG. 13, DIG. 246, DIG. 110; 264/404, 402, 405, 491, DIG. 46, 219; 249/134, 114.1

(56) References Cited

U.S. PATENT DOCUMENTS

| 2,407,833 | 9/1946 | Jablonsky et al. . |
| 2,421,096 | 5/1947 | Vogt . |
| 2,421,097 | 5/1947 | Lakso . |
| 2,438,952 | 4/1948 | Te Grotenhuis . |
| 2,626,428 | 1/1953 | Bosomworth . |
| 2,754,546 | 7/1956 | Mason et al. . |
| 3,519,517 | 7/1970 | Dench . |
| 4,110,139 | 8/1978 | Mashida . |
| 4,268,238 | 5/1981 | Marc . |
| 4,441,876 | 4/1984 | Marc . |
| 4,481,159 | * 11/1984 | Itoh ............................... 264/26 |
| 4,524,037 | * 6/1985 | Marc ............................. 264/26 |
| 4,851,167 | * 7/1989 | Marc ............................. 264/26 |
| 5,082,436 | * 1/1992 | Choi et al. ................ 425/174.8 R |
| 5,139,407 | * 8/1992 | Kim et al. ................. 425/174.8 E |
| 5,166,484 | 11/1992 | Young et al. . |
| 5,290,490 | 3/1994 | Nied et al. . |
| 5,406,058 | 4/1995 | Lipp . |
| 5,420,404 | 5/1995 | Goodman et al. . |
| 5,466,144 | 11/1995 | Adams et al. . |
| 5,639,518 | * 6/1997 | Ando et al. ....................... 427/544 |
| 5,659,972 | 8/1997 | Min et al. . |
| 5,813,134 | 9/1998 | Min et al. . |

OTHER PUBLICATIONS

Anderson, Dielectrics, Chapman and Hall, London, (1964), pp. 15, 16.
Fuchs et al., Functions of a Complex Variable, Pergamon Press, Oxford, (1964) pp. 121,122.
Rohsenow et al., Handbook of Heat Transfer Fundamentals, McGraw–Hill, N.Y., (1985), pp. 2–40, 2–44, 2–45, 4–15.
Pipes et al., Applied Mathematics for Engineers and Physicists, McGraw–Hill, N.Y., (1970, pp. 413–416.

* cited by examiner

Primary Examiner—Harold Pyon
Assistant Examiner—Emmanuel Luk
(74) Attorney, Agent, or Firm—Shughart Thomson & Kilroy P.C.

(57) ABSTRACT

An RF heating apparatus and method utilizing a mold positioned between a pair of electrodes across which an RF field may be applied to heat working material in a cavity of the mold. The material used to form the mold is selected such that its dielectric constant and parameter of thermosensitivity to an RF field are equivalent the dielectric constant and parameter of thermosensitivity to an RF field of the working material to achieve relatively uniform heating of said working material to a selected temperature. The parameter of thermosensitivity to an RF field of a material generally comprises its power factor divided by the product of its density and specific heat, tan $\delta/c\rho$.

30 Claims, 11 Drawing Sheets

METHOD AND APPARATUS FOR MOLDING THREE-DIMENSIONAL OBJECTS OF COMPLEX SHAPE BY MEANS OF RF HEATING

BACKGROUND OF THE INVENTION

This invention relates generally to the art of heat-treatment of dielectric materials by means of a radio frequency (RF) electromagnetic field, and more specifically to the selection or modification of materials to form the mold to provide for uniform curing of thermoplastics and related materials by radio frequency heating. The concepts of the present invention are adapted to the molding of three-dimensional objects of different shapes.

In curing processes utilized for forming thermoplastics and the like into molded articles of varying shape, the uncured or unprocessed plastic material is placed in a mold and then heat is applied to the plastic material to cure the material, causing the material to set in the desired shape and strengthening the plastic material through cross-linking of plastic molecules. One method for heating the plastic material in the mold is through radio frequency or RF heating in which the mold is positioned between two electrodes across which an electromagnetic field may be applied to heat the working material or plastic positioned in the mold. In such a process, the electromagnetic field is applied across the electrodes during a heating cycle or period to raise the temperature of the working material to a target temperature or selected temperature to achieve the desired curing effect. RF heating can also be used for curing wood objects which are placed in a mold like structure between electrodes across which an RF electromagnetic field is applied to heat the wood product and any water contained therein to drive off the water.

The use of RF heating in molding applications and the like has given rise to many problems not only in the selection of suitable mold materials for particular plastics or other working materials, but also with the overall concept of the process as well. In molding processes, it is desirable that curing be uniform across the entire volume of the plastic pieces formed. For this purpose there are two conditions which must be satisfied: (1) the power dissipated in the plastic has to be uniform throughout the volume of the plastic article, which provides uniform temperature distribution throughout the plastic article's volume at any moment during the heating cycle; and (2) the heat flow on the interface of the mold and the plastic has to be as small as practical during the entire heating cycle, which means that the gradient of the temperature at their interface has to be equal to zero, or be as close to zero as practical during the heating cycle.

Prior concepts for uniform curing of dielectric material have been developed. One considers the relation between the loss factors of mold and work materials as a control factor of uniform curing. Loss factor is defined as the product of a dielectric constant $\in$, and power factor tan $\delta$. For example, U.S. Pat. No. 2,754,546 teaches the minimization of heat flow from the article to be molded substantially by equalizing the loss factor of the inner mold layer adjacent the plastic material defining a mold cavity. U.S. Pat. No. 2,626,428 teaches the use of an isolated inner insert in a mold containing a filler with power losses considerably higher than that of the mold material to compensate for heat flow from the plastic to the mold.

Variations of these concepts may be found in several other patents. For example, U.S. Pat. No. 2,438,952 selects a dielectric material of relatively lower power factor than the tire being cured, providing some selectivity in the heating of the tire. U.S. Pat. No. 2,407,833 obtains uniform heating of a fibrous structure of different thickness by using an adhesive of high dielectric loss factor at the thicker cross-sections of an article, and an adhesive of relatively lower loss factor at thinner cross-sections of the article. All of the above described patents, analyzing heat exchange on mold-article interface, take into the account only the loss factor or power factor, but no other physical parameters are considered. A significant drawback of the methodology of all of the above mentioned patents is that their concepts, based on the loss factors of the mold and the work materials, are correct only in limited cases when mechanical and thermal properties of the mold and the work materials are very close. In cases when the mold and work material have different properties, this concept will not work. As it will be shown hereafter, in general cases, to maintain zero heat flow on the mold-plastic interface during a radio frequency heating process, physical parameters such as the power factor divided by the product of the specific heat and density tan $\delta/c\rho$ should be substantially the same for corresponding mold and work materials. The prior patents fail to consider these necessary additional factors. Moreover, loss factors of mold and work materials may considerably differ from each other. For example, in the case of silicon rubber as a mold material and plastic foam as a work material with equal parameters of thermosensitivity (tan $\delta/c\rho$), their loss factors tan $\delta$ will be very different due to the difference of their density c and specific heat $\rho$.

Another concept of uniform curing of work material discussed in the prior art is based on the matching of dielectric constant $\in$ of the mold and work materials. Examples of such can be found in U.S. Pat. No. 2,421,097 and U.S. Pat. No. 4,441,876. As it is shown hereafter, the matching of the dielectric constants $\in$ of the mold and work materials is a necessary condition to provide uniform dissipation of RF energy throughout the work volume. However, uniform dissipation of RF energy is not equivalent to a uniform temperature profile or field across the work material due to heat flow on the mold-plastic interface. Therefore, another condition, approximate equality of the thermosensitivity of the material to the RF field, is necessary to maintain zero heat flow on the mold-plastic interface. The above mentioned prior art patents ignore the heat exchange between the work material and the mold. As will be shown below, this factor must be considered as well to maintain zero heat flow on the mold-plastic interface.

The failure of the prior art patents to discuss the heat exchange between the work material and the mold explains certain disadvantages of the methods discussed therein. As an illustration, let us consider the definition of power factor, which is the basic definition of the theory of dielectric heating. In many publications the introducing of the power factor tan $\delta$ applies to parallel-plate capacitors and neglects the fringing effect. However, RF heating is available not only with flat electrodes, but with concentric cylindrical or spherical electrodes as well. In such cases, the concept of parallel-plate capacitors of unit size will not be applicable because the force lines extend radially outward and they are not parallel to the side surface of the parallel-plate capacitor.

Another disadvantage of the applied theory of some prior art patents is that they consider only exact matching of the dielectric constants of the mold and work materials, and do not investigate the influence of mismatching of the dielectric constants, $\in$, to the uniformity of the dissipated RF energy. It is known that dielectric constant of some thermoplastics may vary considerably with changes in temperature.

Therefore, if in the beginning of the heating cycle there is proper matching of dielectric constants, the dielectric constant of the work or plastic material will change its value during heating, causing mismatching with dielectric constant of the mold material. This will result in a distortion of the field, which will differ for areas of different thickness and thus, by the end of the heating cycle or period the temperature distribution inside the work material will be uneven.

SUMMARY OF THE INVENTION

The present invention provides a molding apparatus comprising a mold formed of mold material and having a cavity therein for placing a plastic material to be molded. The plastic or work material may be in powder, liquid, or sheet form. The apparatus and associated method are developed for forming a three-dimensional plastic piece of complex shape, and for providing even curing of the plastic throughout its volume. The mold is defined by two electrodes, such as parallel plate electrodes, spaced apart from each other. Other means are employed for applying a radio frequency field ("RF field") across the electrodes. Mold material forming a mold structure is disposed on each of the electrodes and at least in part forms the mold cavity when the two electrodes are advanced toward each other to advance the mold structures on each electrode together.

In accordance with the main concept of the present invention, to provide uniform curing of the plastic piece, the mold and plastic materials are selected to simultaneously satisfy two criteria. These criteria comprise two relations between the following physical parameters: dielectric constant ($\in$), power factor (tan $\delta$) specific heat ($\rho$), and density (c). The first relation requires the dielectric constant of the mold and plastic materials to be equal, so as to provide uniform dissipation of RF energy in the plastic piece. The second relation requires the physical parameter of the power factor divided by the product of specific heat and density tan $\delta/c\rho$ to be substantially the same for both materials. For purposes of this application the parameter tan $\delta/c\rho$ for a particular material may be referred to as that material's parameter of thermosensitivity to an RF field. The equality of the parameter tan $\delta/c\rho$ of both materials maintains zero temperature gradient across the plastic-mold interface up to a selected temperature during the heating cycle which eliminates heat flow through the plastic-mold interface and thus provides even curing of plastic or working material throughout its volume.

In one embodiment, the present invention also reduces the total heat energy accumulated in the mold and hence reduces the cooling time of the process. This is accomplished by forming the mold from at least two different compositions of mold material. The composition of the mold material of an inner mold layer adjacent the mold cavity should have approximately the same dielectric constant, $\in$, and physical parameter tan $\delta/c\rho$ as the working material. The remainder of the mold's volume, in an outer layer of the mold, should have the same dielectric constant, $\in$, as the inner mold layer and the working material but a value for the physical parameter tan $\delta/c\rho$ which is significantly lower than that of the inner layer and the working material to facilitate relatively rapid cooling once a targeted temperature for proper curing is reached during the heating cycle. The inner mold layer preferably has a thickness which is at least as thick as and preferably the same thickness as the minimum thickness of the first mold material necessary to provide approximately a zero temperature gradient across an interface between the inner mold layer and the working material upon application of the RF field across the electrodes in heating the working material to a selected temperature within a selected heating time.

The material used to form the mold or mold layers is created by adding selected materials or additives to a base mold material to achieve as close as practical the desired dielectric constant and parameter of thermosensitivity to an RF field for the mold. Recognizing that it generally will not be possible to obtain exact equality of the dielectric constants of the mold material and the working material, the value of mismatching of the dielectric constants, $\in$, of the mold and the worlding materials should be limited to provide an acceptable value of heterogeneity of the RF field, which in the preferred embodiment should not exceed 10%. Similarly, in a preferred embodiment of the invention, any difference in the value of the parameter of thermosensitivity to an RF field for the inner mold layer and the working material should not exceed twenty percent. However, the value of the parameter of thermosensitivity to an RF field for the outer mold layer is preferably at least three times or three hundred percent less than the value of the parameter of thermosensitivity to an RF field for the inner mold layer.

OBJECTS AND ADVANTAGES OF THE INVENTION

It is an object of present invention to provide an RF heating process which provides for uniform curing of a work material; to provide such a process which may be utilized in forming plastic components of relatively complex geometry. It is a further object of this invention to provide an apparatus which will provide the necessary conditions for uniform curing of a plastic piece to be molded in the mold. A further object of the present invention is to reduce the total heat energy accumulated in the mold and hence reduce the cooling time of the process.

Other objects and advantages of this invention will become apparent from the following description taken in conjunction with the accompanying drawings wherein are set forth, by way of illustration and example, certainly embodiments of this invention.

DETAILED DESCRIPTION OF THE INVENTION

Figure 1:
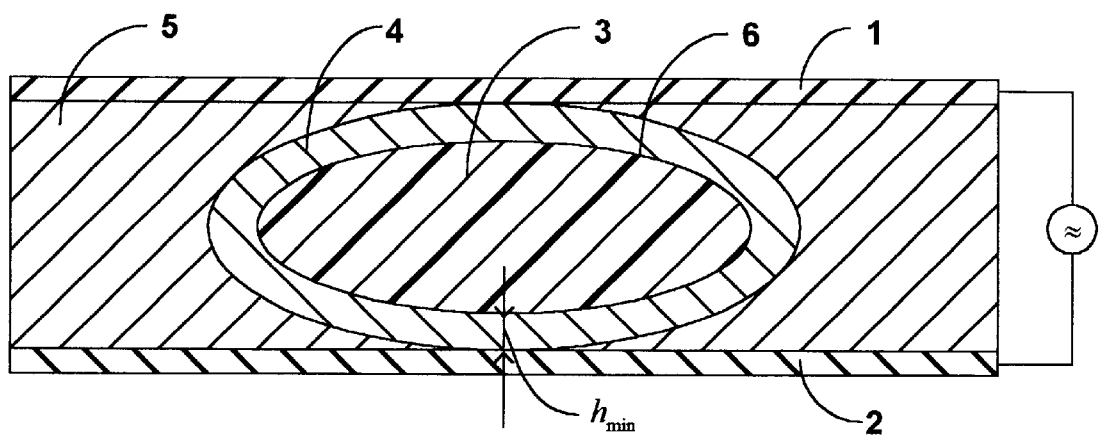
FIG. 1 is a sectional view of a loading capacitor containing a plastic material to be molded, and mold parts of a different composition than the plastic material.

This invention relates to the uniform curing of items, including items of complex shape and of various compositions, and in particular plastic items. For example, the techniques may be used for the molding and curing of shoe soles or in applications such as in the drying of wood. In the preferred embodiment, the employed apparatus includes two parallel electrodes of a loading capacitor, a mold typically made of silicon rubber with selected additives and means for applying an RF electromagnetic field across the electrodes. FIG. 1 is a representative view of a mold for demonstrating the main concept of this invention involving the uniform curing of plastic pieces by equating the dielectric constant $\epsilon$ and parameter $\tan \delta/c\rho$ of the plastic and the mold materials. It will be shown herein that equality of the dielectric constants of both materials $\epsilon_m = \epsilon_p$ will provide uniform dissipation of RF power in the plastic piece no matter what complex shape the plastic piece may be. The equality of parameter $\tan \delta/c\rho$ of both materials will maintain zero heat flow across the interface of the mold and the plastic article during the heating phase and thus provide a uniform temperature field or profile throughout the volume of the plastic piece during heating.

Referring to FIG. 1, there are shown a pair of electrodes land 2 having therebetween a plastic or working piece 3 and an inner mold layer 4 formed from a first mold material and an outer mold layer 5 formed from a second mold material and which both surround the working piece 3 and form a mold cavity 6. For purposes of the following discussion it is generally assumed that the working material 3 is homogeneous and as such its physical parameters such as dielectric constant $\epsilon$, power factor $\tan \delta$, density c, and specific heat $\rho$ are constant throughout the entire volume of the working piece 3.

Figure 2:
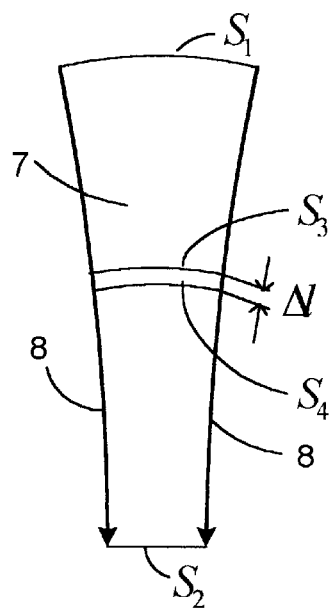
FIG. 2 is a sectional view of an arbitrary gaussian tube, which is helpful in deriving certain physical properties of the electrostatic field inside a dielectric material.

FIG. 2, which is provided for purposes of explanation, comprises a cross-sectional view of narrow three-dimensional gaussian tube 7 which is formed by the force lines 8 of an electrostatic field and which terminates with two equipotential surfaces $S_1$ and $S_2$ which are perpendicular to the force lines 8. Let us now extract in the volume of this gaussian tube two equipotential surfaces $S_3$ and $S_4$ spaced on a distance $\Delta l$ which is much smaller than dimension of $S_3$ and $S_4$. An elementary capacitor which is formed between this surfaces $S_3$ and $S_4$ can be determined by the formula:

$$C = \epsilon_r C_0 = 2\epsilon_r \epsilon_0 \Delta A/\Delta l \text{ (farads)} \quad (1)$$

Where:

$C_0 = 2\epsilon_0 \Delta A/\Delta l$ (farads)—the capacitance of air filled capacitor.

$\epsilon_r$—relative permittivity.

$\epsilon_0 = 8.85 \times 10^{-12}$ farads (meter)$^{-1}$—permittivity of vacuum.

$\Delta A$—the area of the surfaces $S_3$ and $S_4$ $\Delta l$—distance between the surfaces $S_3$ and $S_4$ Because the sides of the above mentioned capacitor are chosen so that they are formed by the force lines, there is no flinging effect.

If the dielectric material is placed in the RF electromagnetic field, then the elementary voltage $\Delta V = \Delta V_0 \exp(i\omega t)$ will appear on the elementary capacitor and an altering current I will flow through this capacitor with the following value:

$$I = C\partial(\Delta V)/\partial t = i\omega \epsilon_r C_0 \Delta V_0 \exp(i\omega t) = i\omega \epsilon_r C_0 \Delta V_0 \quad (2)$$

provided that the dielectric material is a "perfect" one. In general cases, however, an in-phase component of current will appear due to the losses in dielectric medium. This may be characterized by an imaginary component of relative permittivity $$\epsilon_r = \epsilon - i\epsilon'' \quad (3)$$

The current in the capacitor then equals:

$$I = i\omega(\epsilon - i\epsilon'')C_0 \Delta V = \omega \epsilon'' C_0 \Delta V + i\omega \epsilon C_0 \Delta V \quad (4)$$

The magnitude of $\epsilon''$ may be defined by the value of the "loss" component of the current. It is convenient to describe the performance of the dielectric material in terms of its loss angle, which is the phase angle between the total current I and its imaginary component. From the definition of loss angle, one can obtain $$\tan\delta = \frac{\omega\varepsilon''C_0\Delta V}{\omega\varepsilon C_0\Delta V} = \frac{\varepsilon''}{\varepsilon} \quad (5)$$

It should be pointed out that the method of defining $\varepsilon''$ in terms of the in-phase component of current does not require any assumptions about the nature of these losses in the dielectric. From the equation (4), we can find the RF power dissipated in this elementary volume $\Delta v = \Delta A \times \Delta l$:

$$P = I_{real} \times \Delta V \quad (6)$$

The power dissipated in the unit volume of dielectric $P_0$ may be found from the formula (6) with the use of formula (5):

$$P_0 = \frac{P}{\Delta v} = \frac{P}{\Delta A \times \Delta l} = \frac{\omega\varepsilon C_0(\Delta V)^2\tan\delta}{\Delta A \times \Delta l} = \omega\varepsilon\varepsilon_0\left(\frac{\Delta V}{\Delta l}\right)^2\tan\delta \quad (7)$$

Because the surfaces $S_3$ and $S_4$ were chosen perpendicular to the force lines 8 and distance $\Delta l$ between them is small, then $$\frac{\Delta V}{\Delta l} = E \quad (8)$$

Where: E in (V/m) is the magnitude of the field between the surfaces $S_3$ and $S_4$. With the use of formula (8) formula (7) may be modified to the form:

$$P_0 = \omega\varepsilon\varepsilon_0 E^2 \tan\delta = 2\pi f\varepsilon\varepsilon_0 E^2 \tan\delta = 5.56\times10^{-11}\varepsilon f E^2 \tan\delta \quad (9)$$

Here: $P_0$ is in W/m³, f is frequency of the RF generator in Hz, E is in V/m. This obtains a well-known formula for dielectric losses in the unit volume of the dielectric material. It should be pointed out that the formula (9) is derived for the general case of electrostatic field without dependence of the shape of the electrodes and the shape of dielectric material, or the distribution of the field throughout the volume of dielectric. Formula (9) is applicable for any point of any dielectric medium situated in the arbitrary RF field.

Formula (9) shows that if working piece 3 is isotropic throughout the volume (i.e., $\varepsilon$ and $\tan\delta$ are constant across the volume) then the RF power dissipated in the unit volume will be uniform throughout the dielectric media if and only if the magnitude of the field E is constant throughout all the volume of the dielectric:

$$E = \text{constant}.$$

Now it is necessary to consider at what conditions the magnitude of E is constant in the whole volume of dielectric. For this purpose, let us refer to FIG. 2 and require magnitude E of the field to be constant throughout this gaussian tube 7. Because there are no free charges inside of the dielectric, then by integration over the entire closed surface of the gaussian tube in accordance with Gauss' law we will get:

$$\varepsilon_0 \int E \partial S = \Sigma q_{free} = 0 \quad (10)$$

Since the flux through side surfaces of gaussian tube is equal to zero, and since we require the magnitude of the field to be constant throughout this tube, then from (10) it follows readily that $$S_1 E = S_2 E \text{ or } S_1 = S_2 \quad (11)$$

The equality of $S_1$ and $S_2$ means that the force lines in the dielectric material are parallel. This may occur only in the case of uniform electrical field with lines of force parallel to each other. For comparison, in a concentric cylindrical or spherical condenser the magnitude of the field E will be constant on any surface of radius R between the electrodes, but will vary with of R. This occurs because the force lines extend radially outwork and are not parallel.

Figure 3:
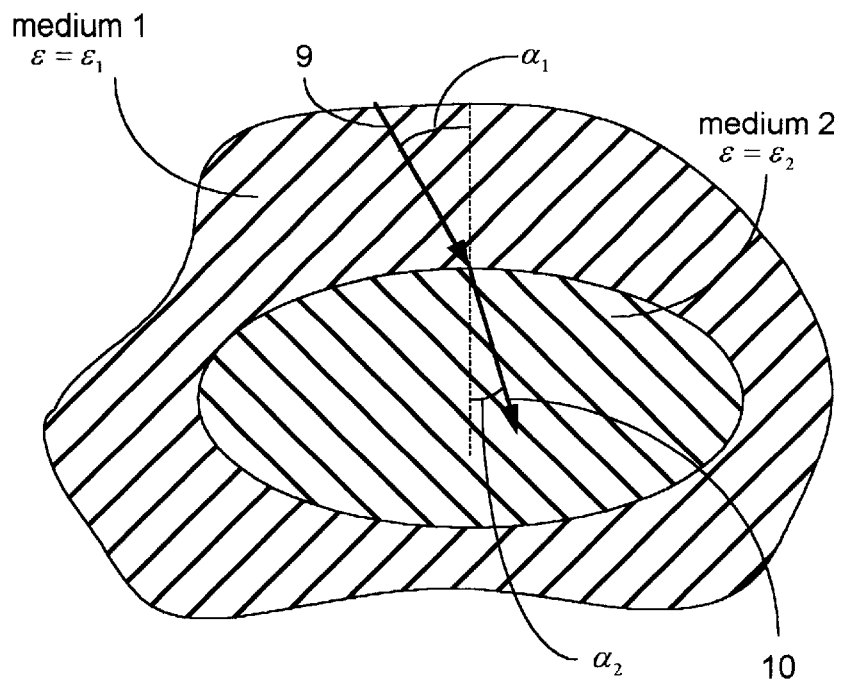
FIG. 3 is a diagram to illustrate the refraction of force lines of an electrostatic field on the interface of two different dielectrics.
Figure 4:
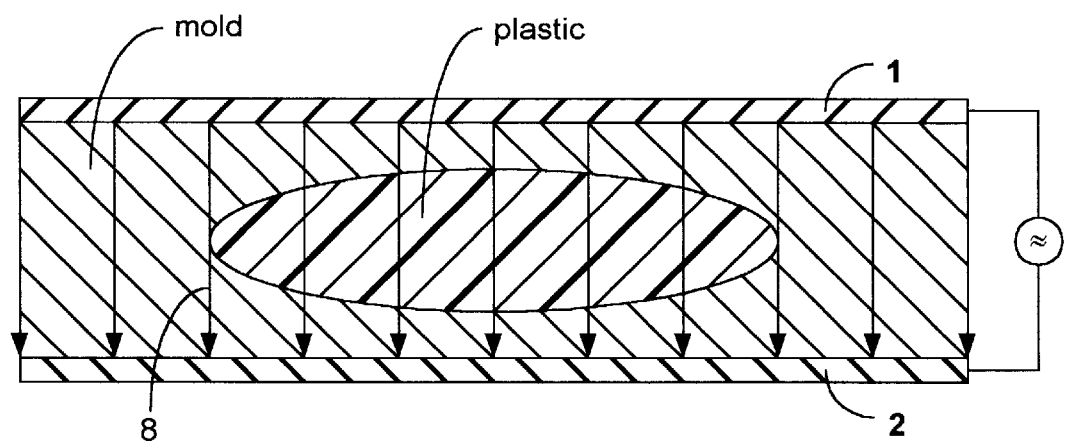
FIG. 4 is a sectional view as in FIG. 1 and shows a uniform electrostatic field between an electrode pair in the case of complete matching of dielectric constants of mold and plastic materials.

Now, let us analyze at what conditions the uniform flat field may be provided in the plastic piece if it is surrounded by another material (mold material). For this purpose, please, refer to FIG. 3 and consider the refraction of force lines 9 and 10 on the interface of two different dielectric media with different dielectric constant. According to the Law of refraction of force lines, if there is no free charges on the interface of two dielectric media, then the refraction of the incident ray 9 may be determined by the formula $$\tan\alpha_2 = \varepsilon_2/\varepsilon_1 \tan\alpha_1 \quad (12)$$

where, $\alpha_1$ and $\alpha_2$ are the angles between the perpendicular to the interface and incident and refracted rays, respectively (see FIG. 3). With $\varepsilon_1 = \varepsilon_2$ one can get $\alpha_1 = \alpha_2$ which means that there is no deflection of force lines on the interface of two dielectric media. In other words, with $\varepsilon_1 = \varepsilon_2$ the lines of force are parallel in both dielectric media which means that in the whole space between plates 1 and 2 the electrical field is presented by parallel lines of force 8 (see FIG. 4). From another known gaussian equation for magnitudes of the electric field on the interface of dielectric media $$\varepsilon_1(E_1)_{normal} = \varepsilon_2(E_2)_{normal} \quad (13)$$

it follows immediately that $E_1 = E_2$, which means that the magnitude of the field in the mold space will be equal to the magnitude of the field in the volume of the plastic piece. Therefore, with equality of dielectric constants of mold and plastic materials $\varepsilon_p = \varepsilon_m$ the field E between plates 1 and 2 will be uniform for any shape of plastic piece.

After this very important conclusion, the equation (9) may be re-written for plastic and mold materials:

$$P_{0,plastic} = 5.56\times10^{-11} f \varepsilon E^2 (\tan\delta)_{plastic} \quad (14)$$

$$P_{0,mold} = 5.56\times10^{-11} f \varepsilon E^2 (\tan\delta)_{mold} \quad (15)$$

here the parameters $\varepsilon$, f, and E are constant throughout all the space between the electrodes 1 and 2. Formulas (14) and (15) show that the power dissipated in the unit volume of the mold and plastic material will be uniform throughout each of their volumes and will differ by magnitude only due to the difference of their power factors.

As was mentioned above, the dielectric constant of many thermoplastics may vary with the temperature by factors of two or more, resulting in considerable distortion of the field. This circumstance necessitates the development of an analytical method of calculating the field distortion caused by difference of $\varepsilon_m$ and $\varepsilon_p$ in the volume of plastic piece.

Below, such a method is developed for structures having finite sizes along the x-axis and the y-axis (the plane of this sheet) and infinite size along z-axis. It may be shown, that this method is applicable for the shapes of finite sizes in all three dimensions. For simplicity, we will limit our search by plane shapes which may be approximated by multi-section rectangular structure.

Figure 5:
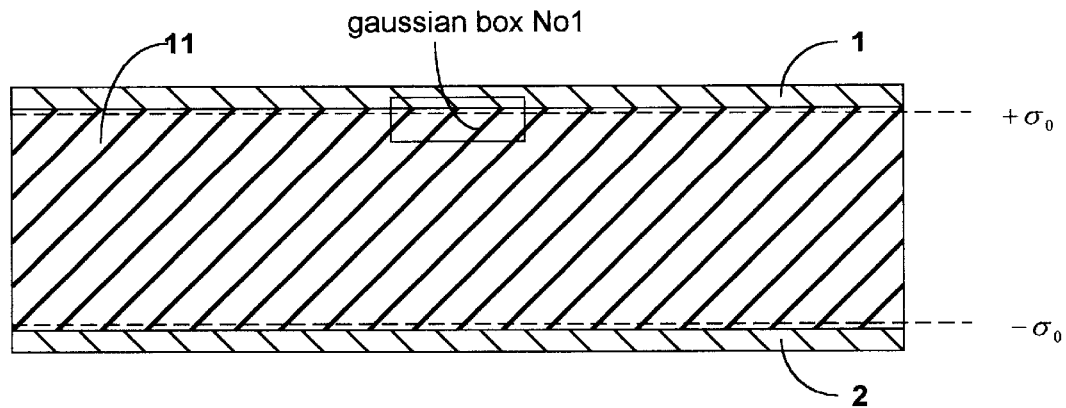
FIG. 5 is a diagram helpful in calculating plate charge densities of the capacitor containing a dielectric slab of infinite size.

Consider the parallel plate capacitor which is formed by plates 1 and 2, shown in FIG. 5. If we place a dielectric slab 11 with the dielectric constant of $\varepsilon_1$ between the plates 1 and 2, then the original electric field causes polarization (or bound) charges of opposite polarity to appear on the surfaces of the dielectric slab 11. The value of an effective charge density $\sigma_0$ (free charge density minus density of bound charges) may be found by applying Gauss' law to the box No.1 and taking into account the magnitude of the field inside of dielectric slab $$E_0 = U/D \qquad (16)$$

Where,

U—voltage on the plates 1 and 2,

D—distance between the plates 1 and 2.

Since the flux of $E_0$ through the sides of the gaussian box No.1 is zero, and the flux is also zero through the end of the electrode, it follows that $$\sigma_0 = \in_0 E_0 = \in_0 U/D \qquad (17)$$

Where, $\sigma_0$—density of effective charges on the plates 1 and 2.

Figure 6:
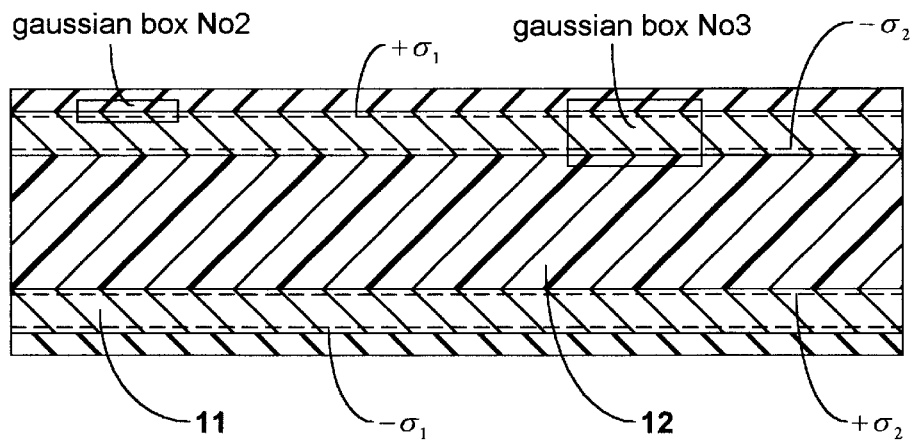
FIG. 6 is a diagram similar to the one shown in FIG. 5 for the case of two different dielectric materials of infinite size.

If inside of this dielectric slab 11 an insert 12 of infinite dimensions of another material with the dielectric constant $\in = \in_2$ and a thickness of d, then on the top and bottom interfaces of dielectrics 11 and 12, bound charges of opposite polarity and different densities will appear due to polarization of dielectric materials (see FIG. 6). The magnitude of fields $E_1$ and $E_2$ within the slab 11 and insert 12 are determined by the normalizing condition:

$$dE_2 + (D-d)E_1 = U \qquad (18)$$

There are no free charges on the interface of the dielectric slab 11 and the insert 12. Thus, Gauss' formula may be applied as follows:

$$\in_1 E_1 = \in_2 E_2 \qquad (19)$$

From the formulas (18) and (19) we can find the magnitudes of fields $E_1$ and $E_2$:

$$E_1 = \frac{\varepsilon_2 U}{(D-d)\varepsilon_2 + d\varepsilon_1} \qquad (20)$$

$$E_2 = \frac{\varepsilon_1 U}{(D-d)\varepsilon_2 + d\varepsilon_1} \qquad (21)$$

The effective density of charges $\sigma_1$ on the plates 1 and 2 now will differ from the value of $\sigma_0$ given by formula (17) and may be found from the gaussian box No.2:

$$\sigma_1 = \varepsilon_0 E_1 = \varepsilon_0 \frac{\varepsilon_2 U}{(D-d)\varepsilon_2 + d\varepsilon_1} \qquad (22)$$

By the same way, the effective density of bound charges $\sigma_2$ on the interface of dielectric slab 11 and insert 12 may be found from the gaussian box No.3:

$$\sigma_1 - \sigma_2 = \in_0 E_2 \qquad (23)$$

From (22) and (23) it follows:

$$\sigma_2 = \sigma_1 - \varepsilon_0 E_2 = \varepsilon_0 E_1 - \varepsilon_0 E_2 = \varepsilon_0 \frac{(\varepsilon_2 - \varepsilon_1)U}{(D-d)\varepsilon_2 + d\varepsilon_1} \qquad (24)$$

As we can see from the formula (24), if $\in_2 < \in_1$ then the charge density $\sigma_2$ on the interface of the slab 11 and insert 12 will have the same polarity as charge density on the plates 1 and 2. In this case, the fields inside the insert 12 due to charges $\sigma_1$ and $\sigma_2$ will add up result in $E_2 > E_1$ (see formulas (20) and (21)).

Alternatively, if an insert 13 of the same dielectric constant $\in_2$ but finite sizes 2a and d is used (see FIG. 7), then the effective field between the plates 1 and 2 will be defined by superposition of the electric fields of two systems of opposite charges $\pm \sigma_0$ and $\pm \sigma_1$ disposed on the plates 1 and 2 and a system of opposite charges $\pm \sigma_2$ disposed on the top 14 and bottom 15 stripes of insert 13. The charge density $\sigma_1$ may be represented by the sum:

$$\sigma_1 = \sigma_0 + (\sigma_1 - \sigma_0)$$

Figure 7:
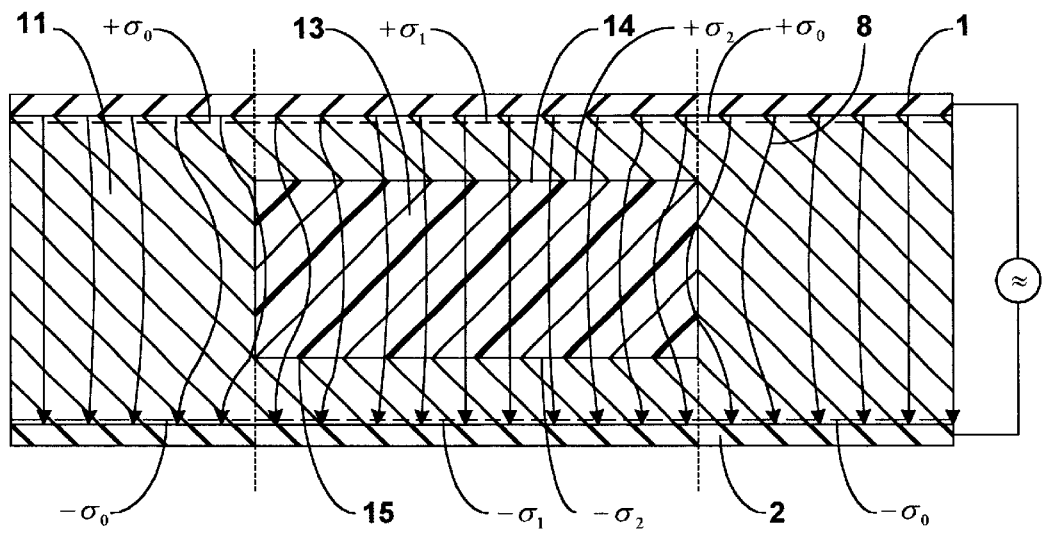
FIG. 7 is a diagram showing the location of different charge densities for the case of the plastic insert of finite size and the distortion of force lines due to finite size of the insert.

It is obvious that the system of charges $\pm \sigma_1$ on FIG. 7 may be replaced by an equivalent system of charges $\pm \sigma_0$ and $\pm(\sigma_1 - \sigma_0)$. Then, the system of charges shown on FIG. 7 is equivalent to the system of charges $\pm \sigma_0$, $\pm \sigma_2$, and $\pm(\sigma_1 - \sigma_0)$, as shown in FIG. 8.

Figure 8:
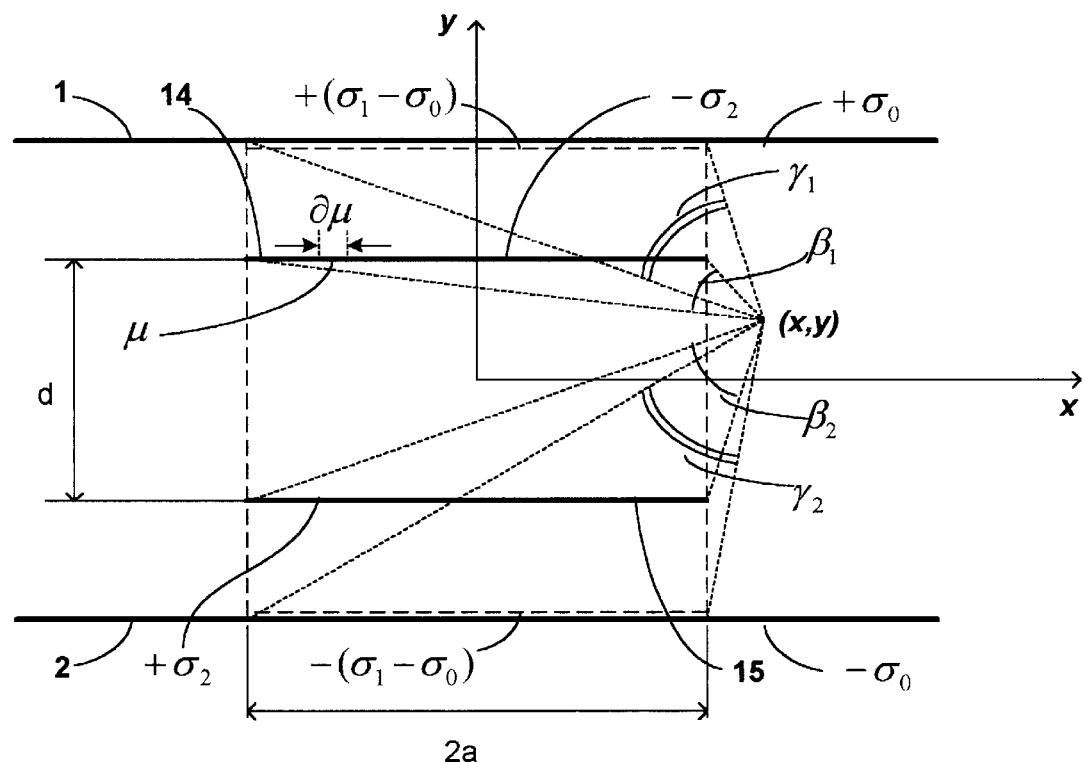
FIG. 8 is a diagram showing a system of charges and their location equivalent to those shown in FIG. 7.

To derive a general equation for an electrical field formed by all these system of charges it is first necessary to get an analytical solution of electrical field formed by the system of charges $\pm \sigma_2$, situated on two parallel strips 14 and 15 as shown in FIG. 8. For this purpose we have to refer to the field of a uniformly charged infinite straight line perpendicular to the (x,y) plain and with a charge q per unit length. It is known that if this straight line is placed in the origin of the (x,y) plain, then respective $E_x$ and $E_y$ components of the intensity of the field in the point (x,y) can be found by the formulas:

$$E_x = \frac{2qx}{x^2 + y^2} \qquad (25)$$

$$E_y = \frac{2qy}{x^2 + y^2} \qquad (26)$$

$$E_z = 0 \qquad (27)$$

where, x and y are coordinates of the field point (x,y).

The formulas (25)–(27) are given in the c.g.s system and they may be converted to the rationalized m.k.s. system by conversion factor $1/(4\pi \in_0)$. Instead of the straight line carrying the charge q per unit length let us consider a narrow strip with the width $\partial \xi$ carrying charge density $-\Sigma_2$ (see FIG. 8). Applying the formulas (25) and (26) to the narrow strip with the width of $\partial \xi$ and located in the point $(\xi, d/2)$ and taking in to the account that the x- and y-components of the distance between this narrow strip and point (x,y) are now represented by $(x-\xi)$ and $(y-d/2)$, respectively, the formulas (25) and (26) may be rewritten in the m.k.s. system (we will use the m.k.s. system hereafter):

$$\partial E_x = \frac{-2\sigma_2}{4\pi\varepsilon_0} \frac{(x-\xi)\partial \xi}{(x-\xi)^2 + (y-d/2)^2} \qquad (28)$$

$$\partial E_y = \frac{-2\sigma_2}{4\pi\varepsilon_0} \frac{(y-d/2)\partial \xi}{(x-\xi)^2 + (y-d/2)^2} \qquad (29)$$

By integration of equation (28) over the top plain of the capacitor 13 we can find the component $E_x'$ of the field in the point (x,y) due to the top plain 14:

$$E_x' = \frac{-2\sigma_2}{4\pi\varepsilon_0} \int_{-a}^{a} \frac{(x-\xi)\partial \xi}{(x-\xi)^2 + (y-d/2)^2} \qquad (30)$$

$$= \frac{-\sigma_2}{4\pi\varepsilon_0} \ln \frac{(x-a)^2 + (y-d/2)^2}{(x+a)^2 + (y-d/2)^2}$$

Similarly, the $E_x''$ component of the field in the point (x,y) due to the bottom plain 15 of the capacitor 13 carrying charge density $+\sigma_2$ may be found to be $$E_x'' = \frac{\sigma_2}{4\pi\varepsilon_0} \ln \frac{(x-a)^2 + (y+d/2)^2}{(x+a)^2 + (y+d/2)^2} \quad (31)$$

$E_x^*$, the component of the field due to the both top and bottom plates 14 and 15 may be derived from (30) and (31) by the use of formula (24):

$$E_x^* = \frac{-\sigma_2}{4\pi\varepsilon_0} \ln \frac{[(x-a)^2+(y-d/2)^2][(x+a)^2+(y+d/2)^2]}{[(x+a)^2+(y-d/2)^2][(x-a)^2+(y+d/2)^2]} \quad (32)$$

$$= \frac{-\sigma_2}{4\pi\varepsilon_0} \ln \frac{r_1 r_2}{r_3 r_4} = \frac{\varepsilon_1 - \varepsilon_2}{4\pi} \frac{U}{(D-d)\varepsilon_2 + d\varepsilon_1} \ln \frac{r_1 r_2}{r_3 r_4}$$

Here $r_1$, $r_2$, $r_3$, and $r_4$ are respective distances of the field point (x,y) from the ends of the top and bottom plains. Next, the computations of the y component of the field of the capacitor 13 is considered. By integration (29) over the top plain 14 the $E_y'$ component of the field may be found as follows:

$$E_y' = \frac{-2\sigma_2}{4\pi\varepsilon_0} \int_{-a}^{a} \frac{(y-d/2)\partial\xi}{(x-\xi)^2 + (y-d/2)^2} \quad (33)$$

$$= \frac{-2\sigma_2(y-d/2)}{4\pi\varepsilon_0} \int_{-a}^{a} \frac{\partial\xi}{(\xi-x)^2 + (y-d/2)^2}$$

$$= \frac{-2\sigma_2}{4\pi\varepsilon_0} \left[ \tan^{-1} \frac{(x-a)}{(y-d/2)} - \tan^{-1} \frac{(x+a)}{(y-d/2)} \right]$$

Similarly, the $E_y''$ component of the field due to bottom plain 15 may be found to be:

$$E_y'' = \frac{-2\sigma_2}{4\pi\varepsilon_0} \int_{-a}^{a} \frac{(y+d/2)\partial\xi}{(x-\xi)^2 + (y+d/2)^2} \quad (34)$$

$$= \frac{2\sigma_2}{4\pi\varepsilon_0} \left[ \tan^{-1} \frac{(x-a)}{(y+d/2)} - \tan^{-1} \frac{(x+a)}{(y+d/2)} \right]$$

$E_y^*$, the component of the field which is developed by both finite plains 14 and 15 can be determined as follows:

$$E_y^* = \frac{-2\sigma_2}{4\pi\varepsilon_0} \left[ \tan^{-1} \frac{x-a}{y-d/2} - \tan^{-1} \frac{x+a}{y-d/2} - \right. \quad (35)$$

$$\left. \tan^{-1} \frac{x-a}{y+d/2} + \tan^{-1} \frac{x+a}{y+d/2} \right]$$

$$= \frac{-2\sigma_2}{4\pi\varepsilon_0} (\beta_1 + \beta_2) = \frac{(\varepsilon_1 - \varepsilon_2)U}{(D-d)\varepsilon_2 + d\varepsilon_1} \frac{\beta_1 + \beta_2}{2\pi}$$

$$= \frac{(\varepsilon_1 - \varepsilon_2)U}{(D-d)\varepsilon_2 + d\varepsilon_1} \frac{\beta}{2\pi}$$

$\beta_1$ and $\beta_2$ are the angles under which the strips 14 and 15 are viewed from the field point (x,y), respectively, $\beta=\beta_1+\beta_2$. The polarity of angles $\beta_1$ and $\beta_2$ may change depending on the position of field point (x,y). For the domain $|y|\leq d/2$, where the insert 13 is located, $\beta_1$ and $\beta_2$ are positive. For the domain $d/2<|y|\leq D/2$ (the space between insert 13 and plates 1,2) one of the angles $\beta_1$ or $\beta_2$ will change its polarity (e.g. positive to negative or vice versa). This occurs because electrical field of charged plane changes its direction depending on whether the field point is above or under the plane.

The same way $E_x^{}$ and $E_y^{}$ components of the field formed by the system of charges $\pm(\sigma_1-\sigma_0)$ may be determined using formulas (17) and (22):

$$E_x^{**} = \frac{\sigma_1 - \sigma_0}{4\pi\varepsilon_0} \frac{[(x+a)^2+(y+D/2)^2]}{[(x+a)^2+(y-D/2)^2]} \frac{\ln[(x-a)^2+(y-D/2)^2]}{[(x-a)^2+(y+D/2)^2]} \quad (36)$$

$$= \frac{1}{4\pi} \left[ \frac{\varepsilon_2 U}{(D-d)\varepsilon_2 + d\varepsilon_1} - \frac{U}{D} \right] \ln \frac{r_5 r_6}{r_7 r_8}$$

$$E_y^{**} = \frac{(\sigma_1 - \sigma_0)}{2\pi\varepsilon_0} \left[ \tan^{-1} x - \frac{a}{y-D/2} - \tan^{-1} x + \frac{a}{y-D/2} - \right. \quad (37)$$

$$\left. \tan^{-1} x - \frac{a}{y+D/2} + \tan^{-1} x + \frac{a}{y+D/2} \right]$$

$$= \left[ \frac{\varepsilon_2 U}{(D-d)\varepsilon_2 + d\varepsilon_1} - \frac{U}{D} \right] \frac{(\gamma_1 + \gamma_2)}{2\pi}$$

$$= -\frac{(\varepsilon_1 - \varepsilon_2)U}{(D-d)\varepsilon_2 + d\varepsilon_1} \frac{d}{D} \frac{\gamma}{2\pi}$$

Here, $r_5$, $r_6$, $r_7$, and $r_8$ are respective distance of the field point (x,y) from the ends of the top 16 and bottom 17 strips, carrying charges $\pm(\sigma_1-\sigma_0)$, and $\gamma_1$ and $\gamma_2$ are the angles under which the strips 16 and 17 are viewed from the field point (x,y). Here $\gamma=\gamma_1+\gamma_2$. The polarity of both angles $\gamma_1$ and $\gamma_2$ remain positive for any field point between plates 1 and 2.

The effective electrical field $E_{eff}$ formed by a system of charges $\pm\sigma_0$, $\pm(\sigma_1-\sigma_0)$ and $\pm\sigma_2$ shown in FIG. 8 can now be derived. Since the x-component of the filed due to a system of charges $\pm\sigma_0$ equals zero at any point between the plates 1 and 2, the x-component of the effective field $E_{x,eff}$ will be equal to the sum of x-components given by formulas (32) and (36):

$$E_{x,eff} = \frac{1}{4\pi} \frac{(\varepsilon_1 - \varepsilon_2)U}{(D-d)\varepsilon_2 + d\varepsilon_1} \ln \frac{r_1 r_2}{r_3 r_4} + \quad (38)$$

$$\frac{1}{4\pi} \left[ \frac{\varepsilon_2 U}{(D-d)\varepsilon_2 + d\varepsilon_1} - \frac{U}{D} \right] \ln \frac{r_5 r_6}{r_7 r_8}$$

$$= \frac{1}{4\pi} \frac{(\varepsilon_1 - \varepsilon_2)U}{(D-d)\varepsilon_2 + d\varepsilon_1} \ln \left[ \frac{r_1 r_2}{r_3 r_4} \left( \frac{r_7 r_8}{r_5 r_6} \right)^{d/D} \right]$$

Since the $E_y$-component of the field formed by system of charges $\pm\sigma_0$ is equal to U/D $$E_y = \frac{U}{D} \quad (39)$$

at any field point between the plates 1 and 2, then y-component of effective field $E_{y,eff}$ may be found by using formulas (35),(37),and (39):

$$E_{y,eff} = \frac{U}{D} + \frac{(\varepsilon_1 - \varepsilon_2)U}{(D-d)\varepsilon_2 + d\varepsilon_1} \left( \frac{\beta}{2\pi} - \frac{d}{D} \frac{\gamma}{2\pi} \right) \quad (40)$$

The formulas (38) and (40) are a complete analytical solution of the problem of a plastic insert of rectangular shape.

Let us now consider formulas (38) and (40) in certain limiting cases.

1. For field points far away from the insert 13 $E_{x,eff}\rightarrow 0$ since $r_1 r_2/r_3 r_4 \rightarrow 1$ and $r_7 r_8/r_5 r_6 \rightarrow 1$. $E_{y,eff} \rightarrow U/D$ since $(\gamma_1+\gamma_2) \rightarrow 0$ and $(\beta_1+\beta_2) \rightarrow 0$.
2. When $\in_1 = \in_2$ then from (38) and (40) it follows that $E_{x,eff}=0$ and $E_{y,eff}=U/D$ for any field point between the plates 1 and 2.
3. From (40) we can find that for any field point on the x-axes, the value of $E_{x,eff}$ is equal to zero due to symmetry.

4. When $a \to \infty$ then for field points inside the insert 12 $(\gamma_1+\gamma_2) \to 2\pi$ and $(\beta_1+\beta_2) \to 2\pi$.
Then in accordance with (21) and (40)

$$E_{y,eff} \to \frac{\varepsilon_1 U}{(D-d)\varepsilon_2 + d\varepsilon_1} = E_2$$

For field points between the insert 12 and plates 1 and 2 one of the angles $\beta_1$ or $\beta_2$ will change polarity and hence $(\gamma_1+\gamma_2) \to 2\pi$ and $(\beta_1+\beta_2) \to 0$. From (20) and (40) it follows that for these field points $$E_{y,eff} \to \frac{\varepsilon_2 U}{(D-d)\varepsilon_2 + d\varepsilon_1} = E_1$$

5. When $d \to 0$ and a is finite then for field points inside the insert 12 $(\beta_1+\beta_2) \to 2\pi$ and from (40) it follows:

$$E_{y,eff} \to \frac{\varepsilon_1}{\varepsilon_2}\frac{U}{D}$$

For any field point between the insert 12 and plates 1, 2 the angle $(\beta_1+\beta_2) \to 0$, and from (40) we can find that $E_{y,eff} \to U/D$.

6. When $\in_2 \to \infty$ and $a \to \infty$ then for field points inside insert 12 the angle $(\gamma_1+\gamma_2)) \to 2\pi$, $(\beta_1+\beta_2) \to 2\pi$ and from (40) it follows that $E_{y,eff} \to 0$. For field points between the insert 12 and the plates 1 and 2 $(\gamma_1+\gamma_2) \to 2\pi$, $(\beta_1+\beta_2) \to 0$ and from (40) we can find that $$E_{y,eff} \to \frac{U}{D-d}$$

This result is obvious because with $\in_2 \to \infty$ the dielectric slab maybe replaced by a metal slab which is characterized with a zero internal electrical field.

7. When $a \to 0$ then $(\gamma_1+\gamma_2) \to 0$, $(\beta_1+\beta_2) \to 0$, and for any field point $E_{y,eff} \to U/D$.

8. When $d \to D$ then $(\gamma_1+\gamma_2) \to (\beta_1+\beta_2)$, and from (40) it follows that for any field point $E_{y,eff} \to U/D$. The last result is in compliance with physical reality. Indeed, when different dielectric materials in the shape of rectangular inserts of thickness D fill the space between plates 1 and 2 then the electrical field between plates will be uniform not withstanding the dielectric constants and width of these inserts.

An examination of formulas (38) and (40) in limiting cases reveals that the developed method for calculating of electrostatic field in structures containing different dielectric materials of finite sizes is true. This method gives results which are in absolute compliance with physical reality. From (38) and (40) the magnitude of effective field $E_{eff} = [(E_{x,eff})^2 + (E_{y,eff})^2]^{1/2}$ may be found and, hence, force lines and equipotential lines of effective field may be drawn (see FIG. 7). These formulas allow determination the heterogeneity of dissipated energy inside the plastic piece.

In practice, plastic articles of complicated shapes with varying thickness are usually employed. The concept developed above allows the determination of an electrical field for complicated structures. By further calculation it can be shown that there is a high limit on the value of $\Delta\in/\in$ in regard with the shape of plastic article and value of acceptable heterogeneity of dissipated RF energy.

Therefore, the next step is to expand the above developed method to structures with different thickness. For simplicity we will consider a symmetrical structure of a plastic piece consisting of two sections with thickness $d_1$ and $d_2$, and the same width a (see FIG. 9). The purpose of the derivation hereinafter is to establish a high limit of $\Delta\in/\in$ with given values of $d_1$ and $d_2$, and an acceptable value of heterogeneity of the electrical field $\Delta E/E$. FIG. 10 shows two field points $O_1$ and $O_2$, located in the center of each rectangle and ends of strips carrying different charges. The following table defines the angles under which the strips with different charges are viewed from the field points $O_1$ and $O_2$.
To make a reading of these angles easier, FIG. 10 is shown with two parts a) and b).

| System of charges | Point of view | View angle of strip from point of view |
|---|---|---|
| $\pm \sigma_2'$ | $O_1$ | $\beta_1' = \angle DO_1E + \angle HO_1I = 4\tan^{-1}a/d_1$ |
| $\pm \sigma_2''$ | $O_1$ | $\beta_1'' = \angle FO_1G + \angle JO_1K = 2(\tan^{-1}3a/d_2 - \tan^{-1}a/d_2)$ |
| $\pm \sigma_2'$ | $O_2$ | $\beta_2' = \angle DO_2E + \angle HO_2I = 2(\tan^{-1}3a/d_1 - \tan^{-1}a/d_1)$ |
| $\pm \sigma_2''$ | $O_2$ | $\beta_2'' = \angle FO_2G + \angle JO_2K = 4\tan^{-1}a/d_2$ |
| $\pm (\sigma_1-\sigma_0)'$ | $O_1$ | $\gamma_1' = \angle AO_1B + \angle LO_1M = 4\tan^{-1}a/D$ |
| $\pm (\sigma_1-\sigma_0)''$ | $O_1$ | $\gamma_1'' = \angle BO_1C + \angle MO_1N = 2(\tan^{-1}3a/D - \tan^{-1}a/D)$ |
| $\pm (\sigma_1-\sigma_0)'$ | $O_2$ | $\gamma_2' = \angle AO_2B + \angle LO_2M = 2(\tan^{-1}3a/D - \tan^{-1}a/D)$ |
| $\pm (\sigma_1-\sigma_0)''$ | $O_2$ | $\gamma_2'' = \angle BO_2C + \angle MO_2N = 4\tan^{-1}a/D$ |

Figure 9:
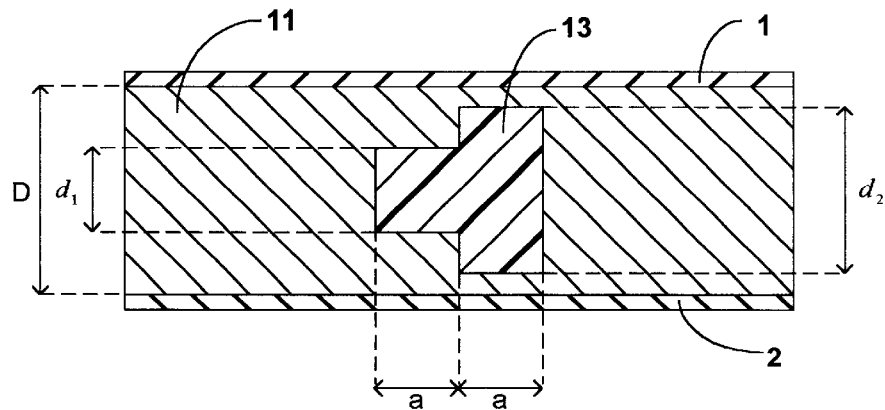
FIG. 9 is a diagram showing the construction of a mold plastic piece having different thickness in different sections.
Figure 10:
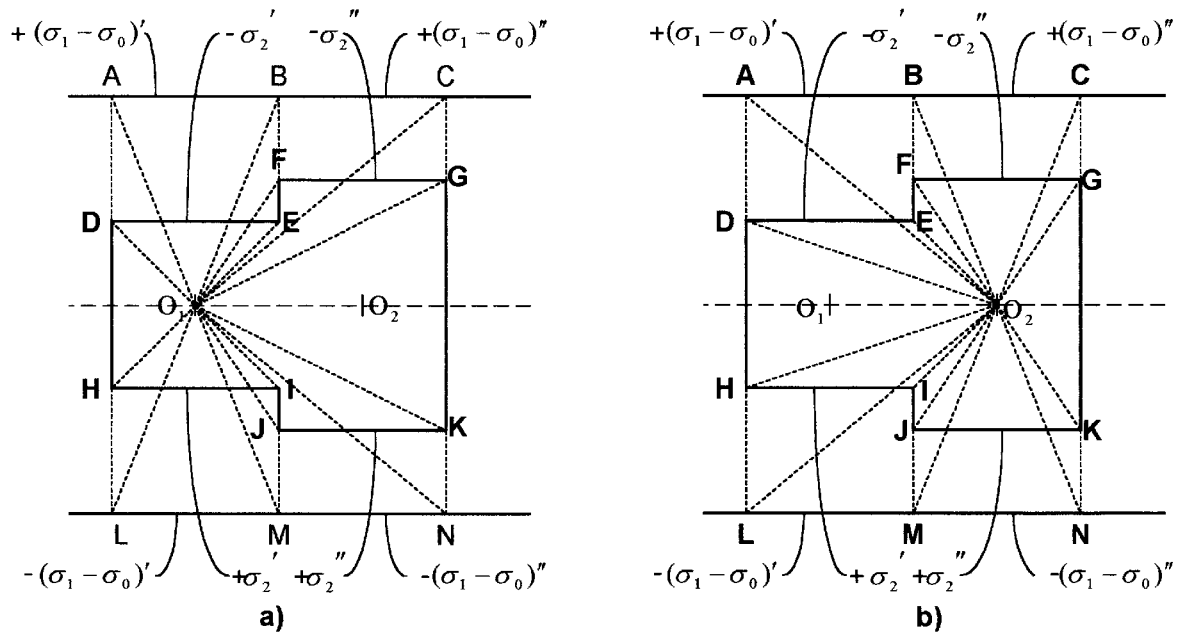
FIG. 10 is a diagram showing the angles under which different charged strips are observed from different field points.

New values of charge densities on the strips may be found by applying formulas (17), (22), and (24) to the structure shown in FIG. 9.

$$\sigma_0 = \varepsilon_0 \frac{U}{D} \tag{41}$$

$$\sigma_1' = \frac{\varepsilon_0 \varepsilon_2 U}{(D-d_1)\varepsilon_2 + d_1 \varepsilon_1} \tag{42}$$

$$\sigma_2' = \frac{\varepsilon_0(\varepsilon_2 - \varepsilon_1)U}{(D-d_1)\varepsilon_2 + d_1 \varepsilon_1} \tag{43}$$

$$\sigma_1'' = \frac{\varepsilon_0 \varepsilon_2 U}{(D-d_2)\varepsilon_2 + d_2 \varepsilon_1} \tag{44}$$

$$\sigma_2'' = \frac{\varepsilon_0(\varepsilon_2 - \varepsilon_1)U}{(D-d_2)\varepsilon_2 + d_2 \varepsilon_1} \tag{45}$$

Because both field points $O_1$ and $O_2$ are located on the line of symmetry, the x component of effective field in these points is equal to zero. Therefore, the value of effective field is equal to $E_{y,eff}$. Formula (40) can be reduced to the form:

$$\frac{E_{eff} - U/D}{U/D} = \frac{\Delta\varepsilon/\varepsilon_2}{1+(d/D)\Delta\varepsilon/\varepsilon_2}\left(\frac{\beta}{2\pi} - \frac{d}{D}\frac{\gamma}{2\pi}\right) \tag{46}$$

Where, $\Delta\in = \in_1 - \in_2$.

Applying the principle of superposition of the fields to the structure in FIG. 9 and using formulas (41) through (46), the effective fields in points $O_1$ and $O_2$ are as follows:

$$\frac{E_{eff}(O_1) - U/D}{U/D} = \frac{\Delta\varepsilon/\varepsilon_2}{1+(d_1/D)\Delta\varepsilon/\varepsilon_2}\left(\frac{\beta_1'}{2\pi} - \frac{d_1}{D}\frac{\gamma_1'}{2\pi}\right) + \frac{\Delta\varepsilon/\varepsilon_2}{1+(d_2/D)\Delta\varepsilon/\varepsilon_2}\left(\frac{\beta_1''}{2\pi} - \frac{d_2}{D}\frac{\gamma_1''}{2\pi}\right) \tag{47}$$

$$\frac{E_{eff}(O_2) - U/D}{U/D} = \frac{\Delta\varepsilon/\varepsilon_2}{1+(d_1/D)\Delta\varepsilon/\varepsilon_2}\left(\frac{\beta_2'}{2\pi} - \frac{d_1}{D}\frac{\gamma_2'}{2\pi}\right) + \frac{\Delta\varepsilon/\varepsilon_2}{1+(d_2/D)\Delta\varepsilon/\varepsilon_2}\left(\frac{\beta_2''}{2\pi} - \frac{d_2}{D}\frac{\gamma_2''}{2\pi}\right) \tag{48}$$

Subtrating (48) from (47) the difference of the values of the effective field in points $O_1$ and $O_2$ is as follows:

$$\frac{\Delta E_{\mathit{eff}}}{U/D} = \frac{E_{\mathit{eff}}(O_1) - E_{\mathit{eff}}(O_2)}{U/D} \quad (49)$$

$$= \frac{\Delta\varepsilon/\varepsilon_2}{1+(d_1/D)\Delta\varepsilon/\varepsilon_2}\left(\frac{\beta'_1-\beta'_2}{2\pi} - \frac{d_1}{D}\gamma'_1 - \frac{\gamma'_2}{2\pi}\right) +$$

$$\frac{\Delta\varepsilon/\varepsilon_2}{1+(d_2/D)\Delta\varepsilon/\varepsilon_2}\left(\frac{\beta''_1-\beta''_2}{2\pi} - \frac{d_2}{D}\gamma''_1 - \frac{\gamma''_2}{2\pi}\right)$$

Figure 11:
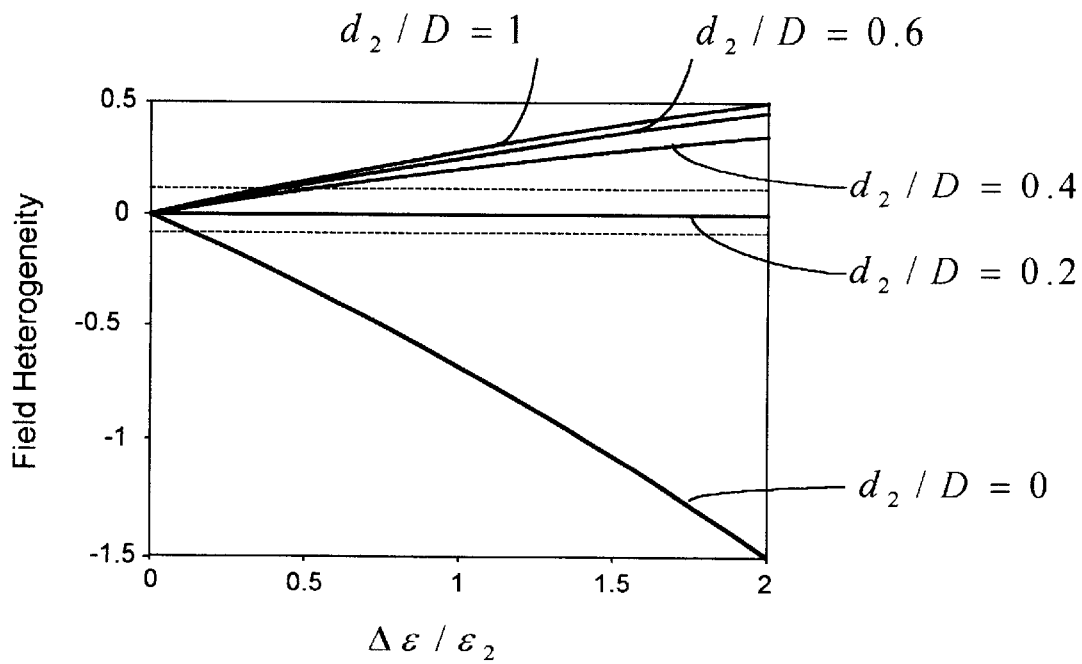
FIG. 11 is a diagram showing curves of heterogeneity of the field $\Delta E_{eff}/E$ versus the difference of dielectric constants of mold and plastic materials $\Delta\epsilon/\epsilon$ for different sizes of a plastic insert.

Typical curves of field heterogeneity $\Delta E_{\mathit{eff}}/(U/D)$ for a/D= 0.2, $d_1/D$=0.2 and different values of $d_2/D$ versus $\Delta\in/\in_2$ are calculated by use of (49) and are shown in FIG. 11. As is clearly seen from FIG. 11, for any particular set of values a/D, $d_1/D$, and $d_2/D$ the heterogeneity of the field $\Delta E_{\mathit{eff}}/(U/D)$ rises with increasing of $\Delta\in/\in_2$. Assuming the acceptable value of heterogeneity can not exceed some predetermined level e.g. $\Delta E_{\mathit{eff}}/(U/D)$<0.1, then from FIG. 11 the high limit of $\Delta\in/\in_2$ can be found. For example, when a/D=0.2, $d_1/D$=0.2, and $d_2/D$=0.4, $(\Delta\in/\in_2)_{max}$=0.5. When $\Delta\in/\in_2$ is given, then the difference of thickness $d_2/D$–$d_1/D$ should be limited to provide an acceptable value of $\Delta E_{\mathit{eff}}/(U/D)$ for uniform curing of plastic.

Figure 12:
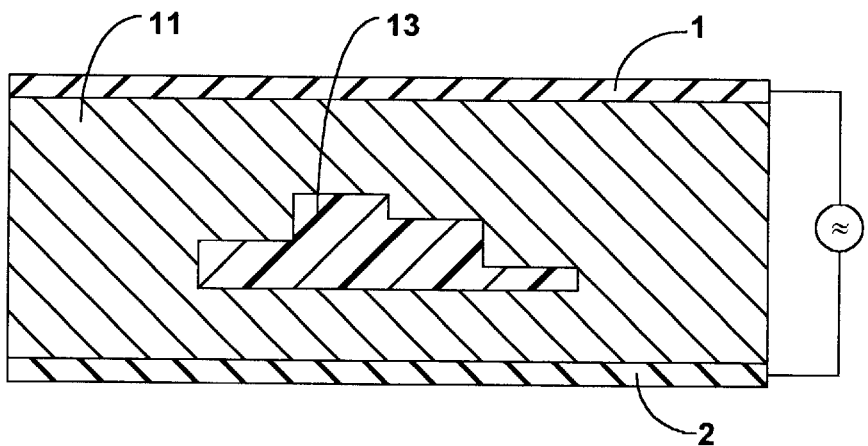
FIG. 12 is a diagram showing a plastic article of multi-section rectangular structure.

Similar curves may be drawn for any other shape of plastic or working piece. For this purpose the actual shape of plastic piece is approximated by a multi-section rectangular structure as shown in FIG. 12. The values of $E_{\mathit{eff}}$ should be compared for field points located in the centers of both thin and relatively thicker rectangles. To derive a formula like (49) for these cases formulas (38) and (40) should be applied to each section of a structure of multiple thickness as was done for the two-thickness configuration. If the configuration of the working piece is not symmetrical along x-axis, then the magnitude of the effective field $E_{\mathit{eff}}=[(E_{x,\mathit{eff}})^2+(E_{y,\mathit{eff}})^2]^{1/2}$ may be found by the use of both formulas (38) and (40).

Figure 13:
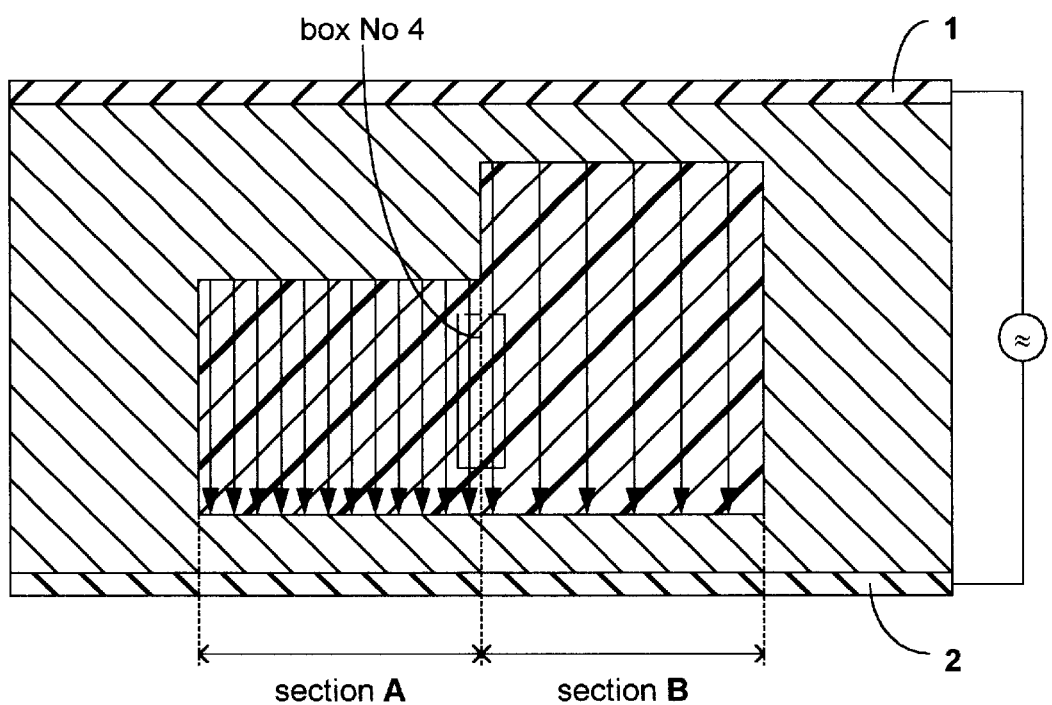
FIG. 13 shows force lines of an electrostatic field in two sections of plastic article with different thickness in approach neglecting edge effect.

From this analysis it is readily clear that it is not correct to apply the concept of parallel plate capacitor for structures of finite sizes like in FIG. 9, because this concept assumes that the electrical field inside each section is uniform throughout its volume. The distortion of the field in structures of finite size caused by the difference of $\in_1$ and $\in_2$ should be taken into account, especially on the borders of two different sections of working piece (see FIG. 13). The analysis of distribution of the field for structures similar to that shown in FIG. 13 was done in U.S. Pat. No. 4,441,876 by assuming that the magnitude of the field in the interior domain of each sections is constant and the formula of the parallel plane capacitor is applicable. From such an assumption, it follows that if there is no distortion of the field, then the force lines in both sections are parallel. Assuming that the magnitudes of the field in these sections differ from each other, we will find that the work which was done in carrying the test charge along the path of closed box No.4 is not equal to zero. This violates the law of conservation of the energy and hence such field could not exist. As we have shown above, the real picture of the field and hence the distribution of power in such structures is much more complicated. With simplifying the problem as was done in U.S. Pat. No. 4,441, 876, the very important criteria which governs the relation between finite sizes of the article and acceptable value of $\Delta\in/\in$ can not be formulated.

Above, we described in detail the problem of dissipation of RF energy in plastic articles and at what conditions it will be uniform throughout their volume. Earlier, we pointed out that uniformity of power losses in plastic piece is not equivalent to the uniformity of the temperature field due to heat flow from the hot mold-plastic structure to the cold plates. This heat exchange will depend on the RF power, boundary conditions, and the properties of the mold and plastic materials. Therefore, the next object of analysis is distortion of temperature field inside of plastic article due to heat flow process.

Figure 14:
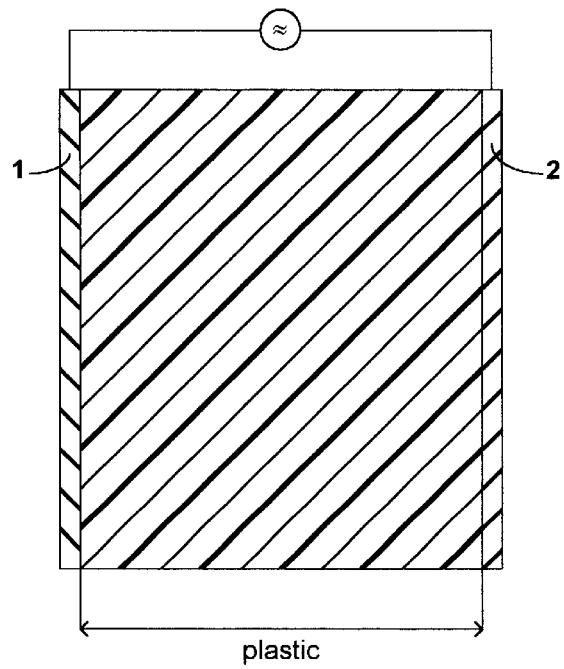
FIG. 14 is a diagram similar to FIG. 5 and showing the arrangement of a plastic slab between the electrodes.

We will study the plane temperature field in dielectric slab 18 of thickness D in the x-direction and infinite size in y- and z-directions, placed between two parallel metal plates 1 and 2 and subjected to RF heating by electromagnetic field applied to these electrodes 1 and 2 (see FIG. 14). Boundary conditions assumptions include that cold metal plates remain at the same ambient temperature all the time and have an intimate contact with dielectric slab. Also, heat is generated uniformly in the dielectric body, and initially the dielectric slab has an ambient temperature. The task is now to derive the dependence of the temperature at each point of the dielectric body 18 versus time for the given value of RF power $P_0$ dissipated in the unit volume of dielectric slab. It is clear that in this case heat flows only in the x-direction and all the y- and z-components are equal to zero. General differential equation for this case is well known and is given by the formula:

$$-k\frac{\partial^2 T(x,t)}{\partial x^2} + c\rho\frac{\partial T(x,t)}{\partial t} = P_0 \quad (50)$$

Here,

T(x,t)=temperature increment at point x at the moment t and equal to difference of actual and ambient temperatures;

k=thermal conductivity of dielectric material;

c=density of material;

ρ=specific heat of dielectric slab;

t=heating time;

$P_0$=power dissipated in unit volume of dielectric material.

The boundary conditions are

T=0 when x=0 for all values of t

T=0 when x=D for all value of t. (51)

The initial condition is:

T=0 for t=0 and all x. (52)

The solution T(x,t) of nonhomogeneous differential equation (50) can be found in the form T(x,t)=$T_1$(x,t)+$T_2$(x) (53)

$T_2$(x) is the function of x alone and is a particular solution of nonhomogeneous equation; $T_1$(x,t) is the solution of homogeneous equation (that is equation (50) when $P_0$=0). To find a particular solution $T_2$(x) of equation (50) consider the case when steady flow of heat in dielectric slab will be established. With steady flow of heat the equality between heat generated inside the body and taken out from the slab by cold electrodes will be reached. In this case (50) may be re-written to the form:

$$-k\frac{\partial^2 T_2(x)}{\partial x^2} = P_0 \quad (54)$$

which has a simple solution:

$$T_2(x) = -\frac{P_0}{2k}x^2 + c_1 x + c_2 \quad (55)$$

When the arbitrary constants $c_1$ and $c_2$ are evaluated so to satisfy boundary conditions (51), than (55) maybe modified to $$T_2(x) = \frac{P_0}{2k}x(D-x) \quad (56)$$

or to the form:

$$T_2(x) = \frac{P_0 D^2}{2k\pi^2}\frac{\pi x}{D}\left(\pi - \frac{\pi x}{D}\right) \quad (57)$$

For further derivation we need to find a Fourier sine-series representation of parabolic on $T_2(x)$ given by (57)

$$T_2(x) = \frac{P_0 D^2}{2k\pi^2}\frac{\pi x}{D}\left(\pi - \frac{\pi x}{D}\right) = \frac{P_0 D^2}{2k\pi^2}\sum_{n=1}^{\infty} b_n \sin\frac{n\pi x}{D} \quad (58)$$

where, Fourier coefficient $b_n$ of the expansion (58) is defined as $$b_n = \frac{2}{\pi}\int_0^\pi \frac{\pi x}{D}\left(\pi - \frac{\pi x}{D}\right)\sin\frac{\pi x}{D}\partial x \quad (59)$$

The values of $b_n$ for parabolic function are well known:

$$b_n = \frac{8}{\pi}\frac{1}{(2n-1)^3} \quad (60)$$

By putting (60) into (58) we arrive at the Fourier sine-series representation of particular solution (50) in the form:

$$T_2(x) = \frac{4P_0 D^2}{\pi^3 k}\sum_{n=1}^{\infty}\frac{1}{(2n-1)^3}\sin\frac{(2n-1)\pi x}{D} \quad (61)$$

The homogeneous form of equation (50) is given by the formula $$-k\frac{\partial^2 T}{\partial x^2} + c\rho\frac{\partial T}{\partial t} = 0 \quad (62)$$

and is known as the Fourier equation of heat balance derived from Fourier's law of conduction. The solution of (62) for the same boundary condition as (51) and initial condition (57) is known and may be presented in the form:

$$T_1(x,t) = \sum_{r=1}^{\infty} A_r[\exp-(\alpha r\pi/D)^2 t]\sin\frac{r\pi x}{D} \quad (63)$$

$A_r$—is an arbitrary constant
$\alpha$—is thermal diffusivity of dielectric material and defined as $\alpha^2 = k/c\rho$.

For evaluation of arbitrary constants $A_r$ lets put t=0 into (63). Now with the initial condition, given by (57), an equation for the constants $A_r$ is as follows:

$$T_1(x,0) = \frac{P_0 D^2}{2k\pi^2}\frac{\pi x}{D}\left(\pi - \frac{\pi x}{D}\right) = \sum_{r=1}^{\infty} A_r \sin\frac{r\pi x}{D} \quad (64)$$

Now by comparison of Fourier sine-series of parabolic finction (64) with sine-series of the same finction given by (60) we immediately find that an arbitrary constants $A_r$ are exact Fourier coefficients $b_n$, given by the formula (60) and multiplied by $P_0 D^2/2k\pi^2$. Thus, formula (63) may be modified to the form:

$$T_1(x,t) = \frac{4P_0 D^2}{\pi^3 k}\sum_{n=1}^{\infty}\frac{\exp\left[-\alpha^2(2n-1)^2\pi^2 t/D^2\right]}{(2n-1)^2}\sin(2n-1)\pi\frac{x}{D} \quad (65)$$

This is solution of homogeneous equation (62) for the boundary condition (51) and the initial condition (57).

The last step in deriving the solution of equation (50) is to employ a combination of two functions $T_1(x,t)$ given in (65) and $T_2(x)$ given in (61) by using formula (53). For this purpose we can present the solution of (50) as a linear combination of functions $T_1(x,t)$ and $T_2(x)$:

$$T(x,t) = c_3 T_1(x,t) + c_4 T_2(x) \quad (66)$$

where arbitrary constants $c_3$ and $c_4$ may be found from the initial condition (52):

$c_3 = 1$ $c_4 = -1 \quad (67)$

From formulas (61), (65), (66), and (67) we find the solution of the equation (50):

$$T(x,t) = \frac{4P_0 D^2}{\pi^3 k}\sum_{n=1}^{\infty}\frac{1-\exp\left[-\pi^2(2n-1)^2\alpha^2 t/D^2\right]}{(2n-1)^3}\sin(2n-1)\pi\frac{x}{D} \quad (68)$$

By putting t=0 into (68) the initial condition is satisfied since every component with an exponent will be equal to 0. Boundary condition (51) is satisfied for all values of t since all $\sin(2n-1)\pi x/D$ will be equal to zero at x=0 and x=D. By applying (68) to the equation (50) and making all differentiations it is shown that (68) is exact solution of (50).

Formula (68) yields many interesting features. Examining (68) for steady flow of heat at t=$\infty$ with an arbitrary value of $P_0$ it follows that:

$$T(x,\infty) = \frac{4P_0 D^2}{\pi^3 k}\sum_{n=1}^{\infty}\frac{1}{(2n-1)^3}\sin(2n-1)\pi\frac{x}{D} \quad (69)$$

Equation (69) is equivalent to equation (61) which is the Fourier sine-series representation of parabolic function (56). Thus, at steady flow of heat the distribution of temperature in dielectric slab 18 may be described by the formula $$T(x, \infty) = \frac{P_0}{2k}x(D-x) \quad (70)$$

On the ends of the slab (x=0, x=D) temperature $T(x,\infty)$ is zero and has a maximum (vertex of the parabola) in the middle points of the slab x=D/2

$$T(x, \infty)_{max} = \frac{P_0 D^2}{8k} \quad (71)$$

Figure 15:
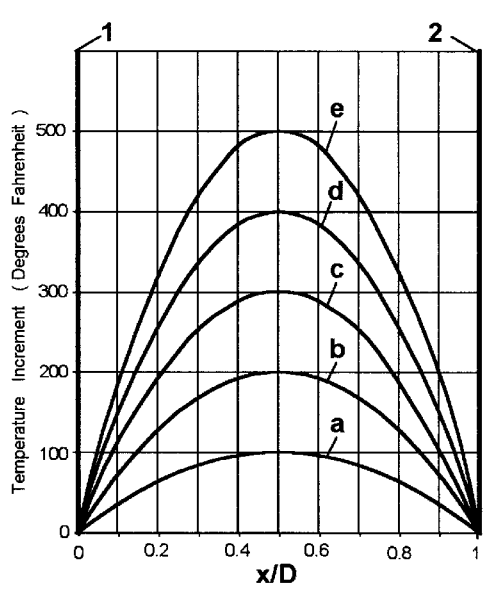
FIG. 15 is a diagram showing a set of curves for temperature increments inside the dielectric slab in the case of steady heat flow for different power ratings.

As an example, the thermoplastic material PVC may be chosen with such thermal and mechanical properties:
k=3.5×10$^{-4}$cal×(s×cm×° C.)$^{-1}$=1.46×10$^{-3}$W×(cm×° C.)$^{-1}$
ρ=0.45 Btu/lb×° F.=0.45 cal/g×° C.
c=1.2 g/cm$^3$ The process temperature for PVC is 385° F. and PVC starts to burn at temperature 410° F. A set of curves (70) for a PVC slab of 1 inch thickness is shown in FIG. 15 for different values of $P_0$: a) $P_0$=1.59 W/in$^3$; b) $P_0$=3.18 W/in$^3$; c) $P_0$=4.77 W/in$^3$; d) $P_0$=6.36 W/in$^3$; and e) $P_0$=7.95 W/in$^3$. One can see that steady flow of heat for the temperature range near 385° F. (that corresponds to temperature increment T≅320° F.) is characterized by very low values of power $P_0$≅5 W/in$^3$. In practice, to reduce the heating time the value of power $P_0$ should be much higher.

Another interesting feature may be found by examining (68) for temperatures in the middle of the slab (x=D/2). At these points $$\sin\frac{(2n-1)\pi x}{D} = (-1)^{n-1} \quad (72)$$

and hence (68) can be re-written to the following form:

$$T\left(\frac{D}{2}, t\right) = \frac{4P_0 D^2}{\pi^3 k} \sum_{n=1}^{\infty} \frac{1 - \exp[-\pi^2 (2n-1)^2 a^2 t/D^2]}{(2n-1)^3}(-1)^{n-1} \quad (73)$$

In the beginning of the heating time the value of t is small and in (73) we can use exponential expansion in series. Neglecting in the exponential series the terms of higher order then t (i.e. using the approximation $\exp(-t) \cong 1-t$) we can modify (73):

$$T\left(\frac{D}{2}, t\right) = \frac{4P_0 D^2}{\pi^3 k} \sum_{n=1}^{\infty} \frac{\pi^2 (2n-1)^2 a^2 t/D^2}{(2n-1)^3}(-1)^{n-1} \quad (74)$$

$$= \frac{4P_0 t}{\pi c \rho} \sum_{n=1}^{\infty} \frac{1}{2n-1}(-1)^{n-1}$$

$$= \frac{4P_0 t}{\pi c \rho} \frac{\pi}{4} = \frac{P_0 t}{c \rho}$$

Where the following well-known formula for summation notation was used:

$$\sum_{n=1}^{\infty} \frac{1}{2n-1}(-1)^{n-1} = \frac{\pi}{4} \quad (75)$$

Figure 16:
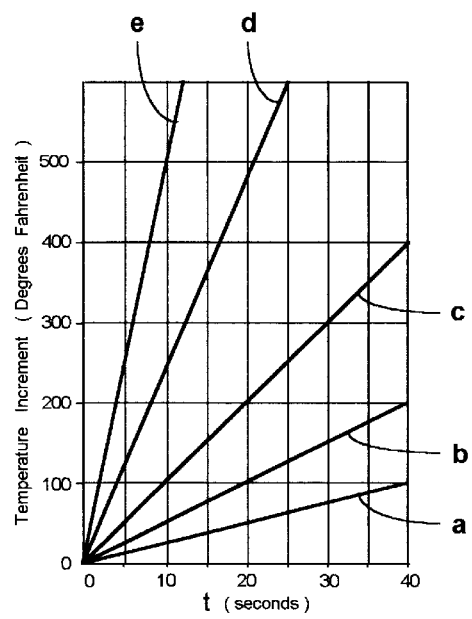
FIG. 16 is a diagram showing another set of curves for temperature increments in the middle of the slab versus heating time.

The formula (74) describes the simple case of heating an insulated body. From equation (74) it follows that the disturbed temperature zone from the plate sides is narrow and does not reach the central zone of the slab. Thus, the temperature at central domain will rise with time in direct proportion given by (74) until the disturbed zone will reach central part of the slab. In FIG. 16 a set of curves showing a temperature increment T in the middle of the slab versus heating time t given by formula (74) for different values of $P_0$: a) $P_0$=51 W/in$^3$, b) $P_0$=102 W/in$^3$, c) $P_0$=205 W/in$^3$, d) $P_0$=510 W/in$^3$, and e) $P_0$=1028 W/in$^3$.

Figure 17:
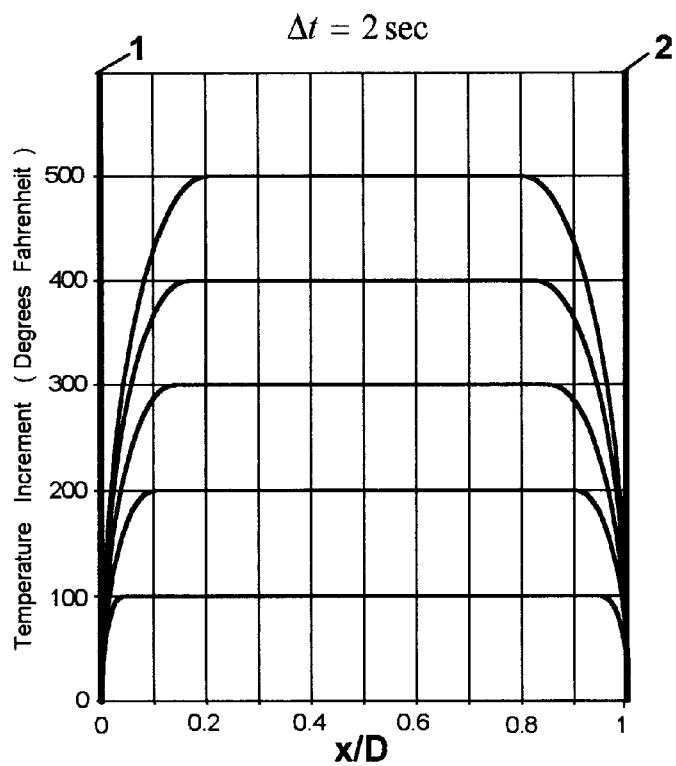
FIG. 17 is a diagram showing a set of curves defining real temperature distribution inside the dielectric slab for different values of heating time and high power rating.
Figure 18:
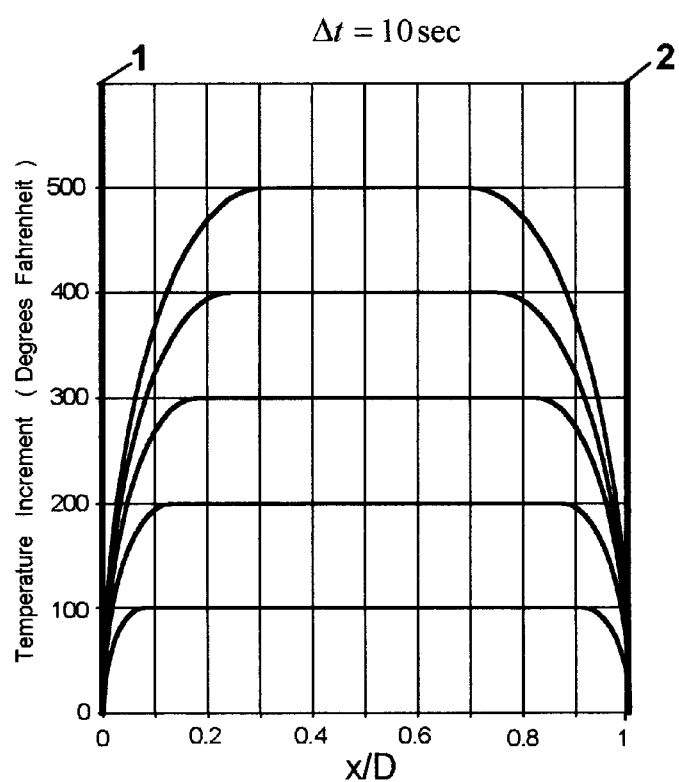
FIG. 18 is a diagram showing a further set of curves similar to those shown in FIG. 17 but for moderate power rating.
Figure 19:
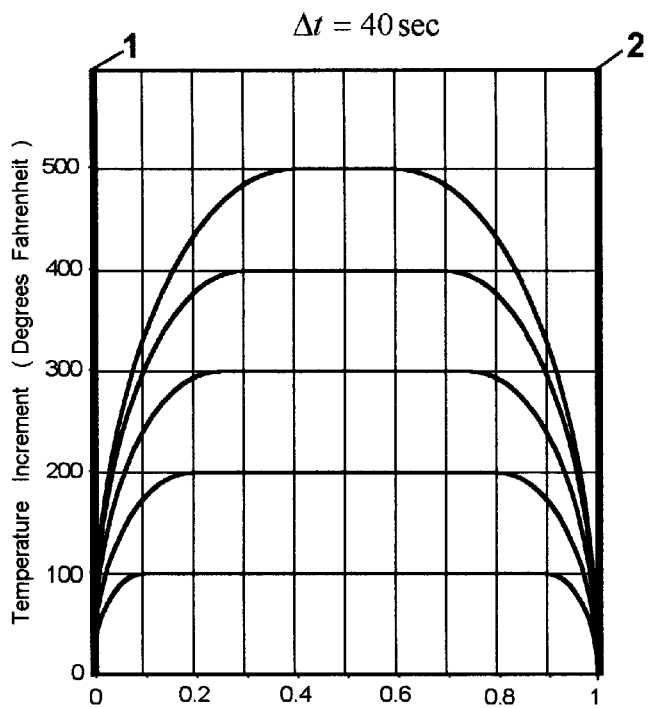
FIG. 19 is a diagram showing a set of curves similar to those in FIG. 17 but for low power rating.
Figure 20:
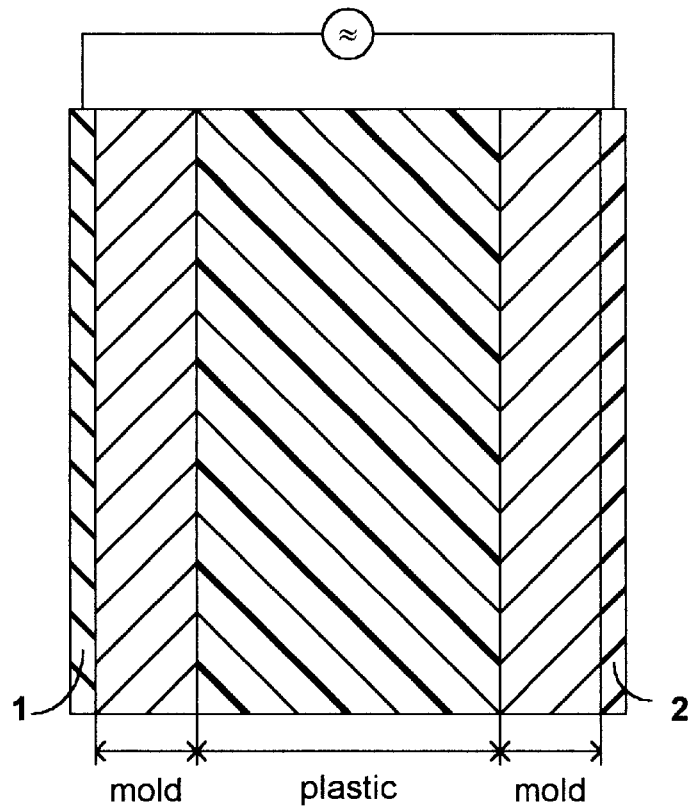
FIG. 20 is a diagram shows three layers of mold-plastic construction similar to the one shown in FIG. 14 and helpful for calculating temperature distribution inside these three-layer structure.

The three families of curves given by formula (68) are shown in FIG. 17, FIG. 18, and FIG. 19 for different values of power $P_0$ dissipated in PVC (e.g. 1028 W/in$^3$, 205 W/in$^3$, and 51 W/in$^3$, respectively). In FIG. 17, FIG. 18, and FIG. 19 the time increments between the curves are equal to Δt=2 seconds, Δt=10 seconds, and Δt=40 seconds, respectively. These curves describe the evolution of the temperature inside the PVC slab with the time. From these curves it is readily clear that the higher the power $P_0$, the narrower the corresponding disturbed zone in the PVC slab and hence wider the central domain with uniform temperature field. For example, on FIG. 17 by the end of the heating time t=6.4 seconds with a power rating $P_0$=1028 W/in$^3$, the temperature increment is T=320° F. (which corresponds to a curing temperature T=390° F.), and the width of central non-disturbed zone is about 0.6 inches. The comparison with FIG. 19 shows that at a lower value $P_0$=51 W/in$^3$, the same process temperature will be attained after 128 seconds of heating time, but now the width of central zone with uniform temperature field is reduced to 0.1 inches. It is obvious that if heating time is chosen so that the plastic will be cured in central zone then near the interface with metal plates, the temperature will be too low to cause curing of the plastic material. If the process time is adjusted for curing domains close to interface with plates, then the central parts of plastic piece will be overheated. That is why in RF molding process it is common to avoid an intimate contact of plastic material to be formed with cold metal plates. It is practical to place the mold material between the plates and plastic piece. A simplified three-layer arrangement of mold with plastic insert is shown in FIG. 20. The purpose is to expand the above developed theory for this case of a three-layer mold-plastic structure and to find the temperature distribution between the layers.

Figure 21:
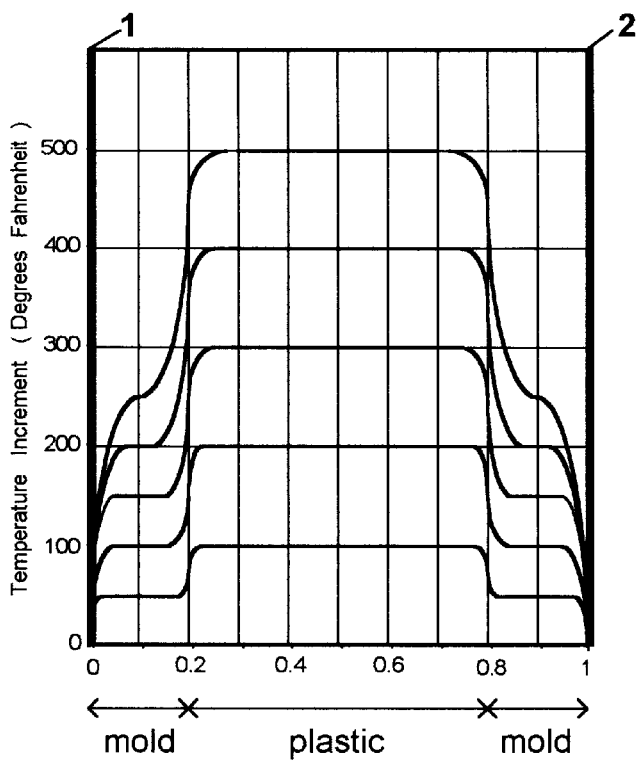
FIG. 21 is a diagram which illustrates the temperature distribution inside the structure shown in FIG. 20 for the case $(\tan \delta/c\rho)_{plastic} > (\tan \delta/c\rho)_{mold}$.

It is common to select a material of the mold having a power factor about ten times less than power factor of plastic material to be treated. The approximate one order difference in power factors means that during the heating time the temperature of the mold will be substantially lower than the temperature of the plastic piece and thus heat will flow from the plastic to the mold material. For quantitative estimations, refer to FIG. 21 where a graphic illustration is shown for temperature distributions in this three-layer structure. With the short heating time t in each layer, the interior domain where the temperature field is not disturbed can be found. Hence, the temperature increments in the middle of the plastic layer $T_p$ and in the middle of mold layer $T_m$ may be derived from formulas (14), (15), and (74):

$$T_p = 5.56 \times 10^{-11} f \varepsilon E^2 \frac{(\tan\delta)_p}{c_p \rho_p} t \quad (76)$$

$$T_m = 5.56 \times 10^{-11} f \varepsilon E^2 \frac{(\tan\delta)_m}{c_m \rho_m} t \quad (77)$$

Here, parameters $c_p$, $\rho_p$, and $(\tan\delta)_p$ refer to plastic materials, and $c_m$, $\rho_m$, and $(\tan\delta)_m$ refer to mold materials.

Formulas (76) and (77) show that the ratio of the temperature ratings in plastic and mold materials are equal to the ratio of their parameters tan δ/cρ

$$\left(\frac{\partial T}{\partial t}\right)_p \bigg/ \left(\frac{\partial T}{\partial t}\right)_m = \frac{(\tan\delta)_p}{c_p\rho_p} \bigg/ \frac{(\tan\delta)_m}{c_m\rho_m} \quad (78)$$

If $(\tan\delta)_p/c_p\rho_p > (\tan\delta)_m/c_m\rho_m$ than the difference between the temperatures $T_p$ and $T_m$ in the central parts of the layers will continually increase with the heating time, causing the heat to flow from the hot plastic to the colder mold. Now, we can examine the case when the parameters tan δ/cρ of both materials are equal:

$$(\tan\delta)_p/c_p\rho_p = (\tan\delta)_m/c_m\rho_m \quad (79)$$

From (78) it follows readily that in this case the temperature ratings of both materials will be equal to each other:

$$\left(\frac{\partial T}{\partial t}\right)_p = \left(\frac{\partial T}{\partial t}\right)_m \quad (80)$$

Figure 22:
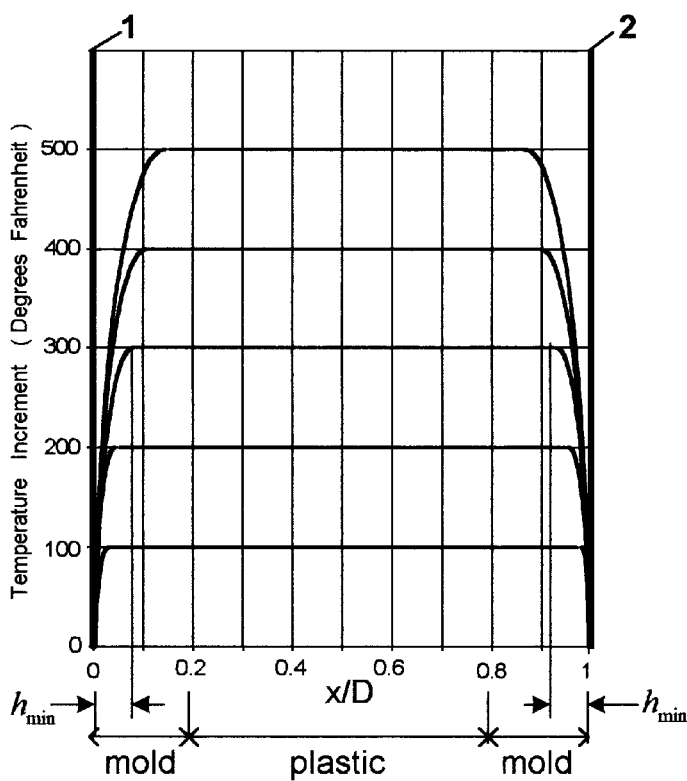
FIG. 22 is a diagram which shows the temperature distribution inside the structure shown in FIG. 20 for the case $(\tan \delta/c\rho)_{plastic} = (\tan \delta/c\rho)_{mold}$.

Because we assume that in the beginning of the heating cycle, the temperature field is not disturbed (i.e., the temperatures of plastic and mold materials are equal to the ambient temperature) then from (80) it follows immediately that the temperatures of the mold and plastic materials in central domains will equal each other at any moment of heating time (see FIG. 22). In other words, the gradient of temperatures on the mold-plastic interface will be equal to zero until the disturbed zone will reach this interface from the outer layer of mold at some moment $t=t_{limit}$. Thus, the power rating $P_0$ should be chosen such that the process time or curing will not exceed this limit time $t_{limit}$ to provide low gradient of temperature on the mold-plastic interface. It may therefore be concluded, that with condition (79) satisfied, the temperature profile of the plastic piece throughout its volume will stay uniform from the beginning of heating cycle up to the moment $t_{limit}$. Thus, equation (79) provides a second condition which should be maintained to provide uniform curing throughout all the volume of plastic piece. We can now summarize that the equality of dielectric constants of plastic and mold materials maintains uniform dissipation of RF energy across the plastic volume. The equality of parameter tan δ/cρ of both materials provides zero temperature gradient on the plastic-mold interface. Both of these conditions are necessary to provide a uniform temperature profile throughout the volume of the plastic piece. Here, it should be noted that the equation (79) does not assume that $(\tan\delta)_p = (\tan\delta)_m$ as it was claimed in the prior art. Moreover, power factors of mold and plastic materials may differ, for example, by factors of two, but the value of (cρ) should compensate this difference to make the equality of formula (79) true.

The minimum thickness $h_{min}$ of the mold layer 4 which provides zero temperature gradient on the plastic-mold interface may be found as done above. For a particular process the value of $h_{min}$ will depend on the rate of RF energy, the heating time of the process, and physical characteristics of the mold material to be used. Another aspect of this invention is depicted in FIG. 1 which shows the coating layer 4 of the mold of thickness $h_{min}$ surrounding the plastic piece 3 to be cured. The composition of mold material and additives in this coating layer 4 should be chosen to provide simultaneous matching of the dielectric constant ∈ and parameter tan δ/cρ of both the plastic article 3 and the mold layer 4. As shown in FIG. 22, in such a case inside of the mold layer 4 will develop a considerable amount of heat. If to make the outer layer 5 of the mold from another composition with the same dielectric constant as in part 4, but with lower value of parameter tan δ/cρ, then the total heat accumulated in the mold will be sufficiently reduced. At these conditions, the temperature field throughout plastic piece 3 will still remain uniform, and temperature gradient on mold-plastic interface will equal to zero as well. By reducing the total accumulated heat in the mold volume, the cooling time may be considerably reduced.

Next we consider the technique for matching of the dielectric constant ∈ and parameter tan δ/cρ of mold and plastic materials. A typical widely used mold material is silicon rubber having different dielectric constants in the range of 3.2 to 4. Another material like Teflon® PTFE Fluoropolymer resin sold by DuPont Fluoroproducts may be used as a base material for the inner layer 4 adjacent to the surface defining a mold cavity.

Plastic materials to be made into a part can be found having large range of dielectric constants starting from less than 2 (if plastic material is in powder or foam form), and increasing up to 6. The preferred technique is to modify the mold material by adding different additive materials to approach both controlling parameters, ∈ and tan δ/cρ, to desirable values. The selection of these materials will depend on whether the dielectric constant of plastic material is higher or lower than dielectric constant of base material of the mold (i.e. silicon rubber).

If the dielectric constant of base mold material (e.g. silicon rubber) is higher than that of the plastic material, then glass microspheres may be used as an additive material for mold. These microspheres, for example, as made by 3M and Zeelan Industries, Inc., have very small dielectric constant up to 1.2, and low power factors as well. This additive material was developed for the purpose of reducing the effective dielectric constant of the composition material. By mixing silicon rubber with a proper percentage of microspheres, an appropriate composition of mold material may be found for outer layer 5 of the mold for matching of its dielectric constant with that of plastic piece 3. This composition will be characterized by very small value of the parameter tan δ/cρ and power dissipated in this part of mold will be low. For the coating layer 4 along with microspheres another additive material like dielectric heating sensitizer should be added to equalize the parameter tan δ/cρ of plastic piece 3 and mold layer 4. For example, this can be accomplished with Structol Frequon B31 made by Structol Company of America. This sensitizer is very effective and along with the remarkable increase in power factor tan δ it will reduce the bulk density of the mold material 4 which will also increase the value of the parameter tan δ/cρ. For recommended dosage 2–8%, the increase in power factor maybe up to 1,000 times, or more, depending on the frequency of the electromagnetic field and at the same time the variation of dielectric constant will be very small.

Now let's consider the apparatus for another case when dielectric constant of base mold material is lower than that of a plastic piece to be fabricated. In the prior art, for this case it was common to use Barium Titanate ($BaTiO_3$) or like materials with high dielectric constants to match dielectric constants of both materials. Such additive materials are applicable for mold layer 5 because with these additives, the dielectric constant will increase, but the parameter tan δ/cρ will remain at a lower value. For inner layer 4 of the mold, however, such additive materials like $BaTiO_3$ cannot be employed due to their very low power factor. It is preferable to use here additive materials which will increase the values of both parameters ∈ and tan δ/cρ simultaneously. An aluminum powder (or powder of many other metals) is an example of a preferred additive material. Adding a predetermined percentage of aluminum (or other metal) powder into the silicon rubber will increase the value of both parameters ∈ and tan δ/cρ. By simple calculation it may be found that adding approximately 30% (by weight) of aluminum powder will increase the value of the dielectric constant of silicon rubber from 3.4 to 7.7. The estimated value of the power factor of such a composition is 0.05. That is much higher than the power factor of pure silicon rubber which is on the order of 0.01. If the increase in tan δ is not enough for matching of parameter tan δ/cρ of the mold layer 4 and plastic piece 3 then some percentage of sensitizer B31 should be added to the mold part 4. The best way to select the percentage of each additive material is not with calculations, but by making small samples of this composition and measuring the value of all parameters ∈, tan δ, c, and ρ. The value of ∈ and tan δ of samples may be found by direct measuring with a standard Q-meter. The value of the density c of the sample may be found by measuring the volume of the sample, and determining its weight (density= weight/volume). Specific heat may be found by a standard method of measuring the increase of water temperature when a hot sample is lowered into the water. Knowing the masses, initial and final temperatures of water, and the initial and final temperatures of the sample allows a determination the value of specific heat of the sample.

Another effective additive material to increase the values of both parameters ∈ and tan δ/cρ is a ferrite powder sold by Steward Company. This ferrite powder has a high dielectric constant and a high power factor along with its high Curie temperature (≈500° C.). The wide hysteresis loop B vs H of this or like ferrite materials represents high power losses of RF energy during a cycle. Simple calculation may show that for a ferrite-silicone mixture consisting of 40% ferrite powder by weight the estimated increase in ∈ will be from 3.4 for pure silicone rubber to 8.5, and an increase in the power factor will be from 0.01 to 0.04. If this increase is not enough for matching of the parameter tan δ/cρ then some additional percentage of B31 may be added to the mold composition in part 4. Again, the proper percentage of additives may be found by making test samples and by direct measurement of ∈ and tan δ on Q-meter.

What is claimed is:

1. An apparatus for heating a working material comprising:
   a) a pair of electrodes having a source of radio frequency energy coupled thereto for creating a radio frequency field therebetween; and
   b) a mold positioned between said electrodes; said mold formed of a mold material and having an inner surface defining a mold cavity; said mold adapted for receiving the working material in said mold cavity; said mold material selected to have a dielectric constant approximately equal to a dielectric constant of the working material and a parameter of thermosensitivity to an RF field approximately equal to a parameter of thermosensitivity to an RF field of the working material, such that application of said radio frequency field across said electrodes results in relatively uniform heating of the working material to a selected temperature; wherein the parameter of thermosensitivity to an RP field of a material is equal to the tangent of the loss angle of the material divided by the product of its density and specific heat.

2. The apparatus as in claim 1 wherein:
   a) any difference between the dielectric constant of said mold material and the working material is limited so that the heterogenity of the RF field inside the working material does not exceed ten percent.

3. The apparatus as in claim 1 wherein:
   a) any difference between the parameter of thermosensitivity to an RF field of said mold material and the working material does not exceed twenty percent.

4. The apparatus as in claim 1 wherein:
   a) any difference between the parameter of thermosensitivity to an RF field of said mold material and the working material does not exceed ten percent.

5. The apparatus as in claim 1 wherein:
   a) any difference between the parameter of thermosensitivity to an RF field of said mold material and the working material does not exceed five percent.

6. The apparatus of claim 1 wherein:
   a) said mold material comprises a first mold material forming an inner layer of said mold adjacent said mold cavity and said mold further comprises an outer layer formed from a second mold material; said second mold material having a dielectric constant approximately equal to the dielectric constant of said first mold material and the working material and having a parameter of thermosensitivity to an RF field which is lower than the parameter of thermosensitivity to an RF field of said first mold material and the working material.

7. The apparatus as in claim 6 wherein:
   a) said inner layer of said mold is at least as thick as the minimum thickness of said first mold material necessary to provide approximately a zero temperature gradient across an interface between said inner layer of said mold and the working material upon application of said RF field across said electrodes in heating the working material to said selected temperature within a selected heating time.

8. The apparatus as in claim 6 wherein:
   a) said inner layer of said mold is approximately as thick as the minimum thickness of said first mold material necessary to provide approximately a zero temperature gradient across an interface between said inner layer of said mold and the working material upon application of said RF field across said electrodes in heating the working material to said selected temperature within a selected heating time.

9. The apparatus as in claim 6 wherein:
   a) any difference between the dielectric constant of said first and second mold materials and the working material is limited so that the heterogenity of the RF field inside the working material does not exceed ten percent.

10. The apparatus as in claim 6 wherein:
    a) any difference between the parameter of thermosensitivity to an RF field of said first mold material and the working material does not exceed twenty percent and the parameter of thermosensitivity to an RF field of said second mold material is lower than the parameter of thermosensitivity to an RF field of said first mold material by at least three hundred percent.

11. A process for creating a mold for use in a radio frequency heating apparatus for providing relatively uniform heating to a selected temperature of a working material positioned in a mold cavity of said mold through the application of a radio frequency field across a pair of electrodes positioned on opposite sides of said mold to create a radio frequency field; said process comprising:

a) forming said mold of a mold material selected to have a dielectric constant approximately equal to a dielectric constant of the working material and a parameter of thermosensitivity to an RF field approximately equal to a parameter of thermosensitivity to an RF field of the working material, such that application of said radio frequency field across said pair of electrodes results in relatively uniform heating of the working material to said selected temperature; and wherein the parameter of thermosensitivity to an RF field of a material is equal to the tangent of the loss angle of the material divided by the product of its density and specific heat.

12. The process of claim 11 wherein:
a) said step of forming said mold includes selecting said mold material such that any difference between the dielectric constant of said mold material and the working material is limited so that the heterogenity of the RF field inside the working material does not exceed ten percent.

13. The process as in claim 11 wherein:
a) said step of forming said mold includes selecting said mold material such that any differences between the parameter of thermosensitivity to an RF field of said mold material and the working material does not exceed twenty percent.

14. The process as in claim 11 wherein:
a) said step of forming said mold includes selecting said mold material such that any differences between the parameter of thermosensitivity to an RF field of said mold material and the working material does not exceed ten percent.

15. The process as in claim 11 wherein:
a) said step of forming said mold includes selecting said mold material such that any differences between the parameter of thermosensitivity to an RF field of said mold material and the working material does not exceed five percent.

16. The process as in claim 11 wherein said mold material comprises a first mold material and wherein:
a) said step of forming said mold comprises forming said first mold material into an inner mold layer adjacent said mold cavity and forming an outer layer of said mold from a second mold material adjacent said inner mold layer; said second mold material having a dielectric constant approximately equal to the dielectric constant of said first mold material and the working material and having a parameter of thermosensitivity to an RF field which is lower than the parameter of thermosensitivity to an RF field of said first mold material and the working material.

17. The process as in claim 16 wherein:
a) said step of forming said inner layer of said mold comprises forming said inner layer of said mold to be at least as thick as the minimum thickness of said first mold material necessary to provide approximately a zero temperature gradient across an interface between said inner layer of said mold and the working material upon application of said RF field across said electrodes in heating the working material to said selected temperature within a selected heating time.

18. The process as in claim 16 wherein:
a) said step of forming said inner layer of said mold comprises forming said inner layer of said mold to be approximately as thick as the minimum thickness of said first mold material necessary to provide approximately a zero temperature gradient across an interface between said inner layer of said mold and the working material upon application of said RF field across said electrodes in heating said working material to the selected temperature within a selected heating time.

19. The process of claim 16 wherein:
a) said step of forming said mold includes selecting said first and second mold materials such that any difference between the dielectric constant of said first and second mold materials and the working material is limited so that the heterogenity of the RF field inside the working material does not exceed ten percent.

20. The process as in claim 16 wherein:
a) said step of forming said mold includes selecting said first mold material such that any difference between the parameter of thermosensitivity to an RF field of said first mold material and the working material does not exceed twenty percent and the parameter of thermosensitivity to an RF field of said second mold material is lower than the parameter of thermosensitivity to an RF field of said first mold material by at least three hundred percent.

21. A process for creating a mold for use in a radio frequency heating apparatus for providing relatively uniform heating to a selected temperature of a working material positioned in a mold cavity of the mold through the application of a radio frequency field across a pair of electrodes positioned on opposite sides of the mold to create a radio frequency field; the process comprising:
a) determining the dielectric constant and the parameter of thermosensitivity to an RF field of the working material;
b) selecting a base material and determining the dielectric constant and the parameter of thermosensitivity to an RF field of the base material:
c) identifying at least one additive material which may be added to the base material to produce a mold material having a dielectric constant approximately equal to the dielectric constant of the working material and a parameter of thermosensitivity to an RF field approximately equal to the parameter of thermosensitivity to an RF field of the working material;
d) adding the additive material to a first quantity of the base material in an amount sufficient to produce the resulting mold material having a dielectric constant approximately equal to the dielectric constant of the working material and a parameter of thermosensitivity to an RF field approximately equal to the parameter of thermosensitivity to an RF field of the working material,
e) forming at least an inner layer of the mold, adjacent the mold cavity, from the mold material.

22. The process of claim 21 wherein:
a) the step of adding the additive material to the base material includes adding the additive material in an amount such that any difference between the dielectric constant of the mold material and the working material is limited so that the heterogenity of the RF field inside the working material does not exceed ten percent.

23. The process as in claim 21 wherein:
a) the step of adding the additive material to the base material includes adding the additive material in an amount such that any differences between the parameter of thermosensitivity to an RF field of the mold material and the working material does not exceed twenty percent.

24. The process as in claim 21 wherein:
a) the step of adding the additive material to the base material includes adding the additive material in an amount such that any differences between the parameter of thermosensitivity to an RF field of the mold material and the working material does not exceed ten percent.

25. The process as in claim 21 wherein:
a) the step of adding the additive material to the base material includes adding the additive material in an amount such that any differences between the parameter of thermosensitivity to an RF field of the mold material and the working material does not exceed five percent.

26. The process as in claim 21 wherein the mold material comprises a first mold material and the additive material comprises a first additive material and the process further comprises the steps of:
a) identifying at least one second additive material which may be added to the base material to produce a second mold material having a dielectric constant approximately equal to the dielectric constant of the working material and a parameter of thermosensitivity to an RF field which is lower than the parameter of thermosensitivity to an RF field of the first mold material and the working material;
b) adding the second additive material to a second quantity of the base material in an amount sufficient to produce the second mold material having a dielectric constant approximately equal to the dielectric constant of the working material and a parameter of thermosensitivity to an RF field which is lower than the parameter of thermosensitivity to an RF field of the first mold material and the working material;
c) forming a second layer of the mold, adjacent the inner layer, from the second mold material.

27. The process as in claim 26 wherein:
a) the step of forming the inner layer of the mold comprises forming the inner layer of the mold to be at least as thick as the minimum thickness of the first mold material necessary to provide approximately a zero temperature gradient across an interface between the inner layer of the mold and the working material upon application of said RF field across the electrodes in heating the working material to the selected temperature within a selected heating time.

28. The process as in claim 26 wherein:
a) the step of forming the inner layer of the mold comprises forming the inner layer of the mold to be approximately as thick as the minimum thickness of the first mold material necessary to provide approximately a zero temperature gradient across an interface between the inner layer of the mold and the working material upon application of the RF field across the electrodes in heating the working material to the selected temperature within a selected heating time.

29. The process of claim 26 wherein:
a) sufficient amounts of the first and second additive materials are added to the first and second quantities of base material such that any difference between the dielectric constant of the first and second mold materials and the working material is limited so that the heterogenity of the RF field inside the working material does not exceed ten percent.

30. The process of claim 26 wherein any difference between the parameter of thermosensitivity to an RF field of the first mold material and the working material does not exceed twenty percent and the parameter of thermosensitivity to an RF field of the second mold material is lower than the parameter of thermosensitivity to an RF field of the first mold material by at least three hundred percent.

* * * * *